US010785777B2

(12) United States Patent
Eitan et al.

(10) Patent No.: US 10,785,777 B2
(45) Date of Patent: *Sep. 22, 2020

(54) APPARATUS AND METHOD FOR RECEIVING DATA FRAMES

(71) Applicant: QUALCOMM Incorporated, San Diego, CA (US)

(72) Inventors: Alecsander Petru Eitan, Haifa (IL); Amichai Sanderovich, Atlit (IL); Gal Basson, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,696

(22) Filed: Jun. 5, 2018

(65) Prior Publication Data

US 2018/0288759 A1 Oct. 4, 2018

Related U.S. Application Data

(63) Continuation of application No. 15/009,733, filed on Jan. 28, 2016, now Pat. No. 10,021,695.

(Continued)

(51) Int. Cl.
*H04W 72/04* (2009.01)
*H04L 1/00* (2006.01)
(Continued)

(52) U.S. Cl.
CPC ........ *H04W 72/048* (2013.01); *H04B 7/0426* (2013.01); *H04L 1/009* (2013.01);
(Continued)

(58) Field of Classification Search
CPC ..... H04B 7/0413; H04B 7/0452; H04L 1/003; H04L 1/0079; H04L 1/0083;
(Continued)

(56) References Cited

U.S. PATENT DOCUMENTS 6,532,211 B1 3/2003 Rathonyi et al.
6,636,500 B2 * 10/2003 Krishnamoorthy ... H04L 1/0003 370/347

(Continued)

FOREIGN PATENT DOCUMENTS

CN 102150405 B 11/2013
CN 105917713 A * 8/2016 ......... H04L 25/0228
(Continued)

OTHER PUBLICATIONS

Ghasempour et al., IEEE 802.11ay: Next-Generation 60 GHz Communication for 100 Gb/s Wi-Fi, Dec. 2017, IEEE Communications Magazine, DOI: 10.1109/MCOM.2017.1700393 (Year: 2017).*

(Continued)

*Primary Examiner* — Eric Nowlin
(74) *Attorney, Agent, or Firm* — Kevin M. Donnelly; Loza & Loza, LLP

(57) ABSTRACT

Certain aspects of the present disclosure provide an apparatus for wireless communications. The apparatus includes a processing system configured to generate a frame comprising a preamble, a first header, and a second header, wherein the preamble and the first header are configured to be decoded by a first device operating according to a first protocol, the second header not being configured to be decoded by the first device, and wherein the preamble, the first header, and the second header are configured to be decoded by a second device operating according to a second protocol; and an interface configured to output the frame for transmission.

32 Claims, 11 Drawing Sheets

Related U.S. Application Data

(60) Provisional application No. 62/147,479, filed on Apr. 14, 2015.

(51) Int. Cl.

| | | |
|---|---|---|
| *H04B 7/0426* | (2017.01) | |
| *H04L 27/26* | (2006.01) | |
| *H04W 52/02* | (2009.01) | |
| *H04W 74/04* | (2009.01) | |
| *H04W 88/02* | (2009.01) | |
| *H04W 88/08* | (2009.01) | |

(52) U.S. Cl.
CPC .......... *H04L 1/0079* (2013.01); *H04L 1/0083* (2013.01); *H04L 27/2601* (2013.01); *H04W 52/0203* (2013.01); *H04W 52/0206* (2013.01); *H04W 74/04* (2013.01); *H04L 1/0026* (2013.01); *H04W 88/02* (2013.01); *H04W 88/08* (2013.01); *Y02D 70/00* (2018.01); *Y02D 70/142* (2018.01)

(58) Field of Classification Search
CPC ... H04L 5/0007; H04L 5/0048; H04L 5/0053; H04L 5/0098; H04L 27/2602; H04L 27/2613; H04L 69/18; H04L 69/22; H04W 28/06; H04W 72/04; H04W 72/042; H04W 72/0446; H04W 72/0453; H04W 72/048; H04W 84/12; H04W 88/08
See application file for complete search history.

(56) References Cited

U.S. PATENT DOCUMENTS

| | | | | |
|---|---|---|---|---|
| 7,447,232 B2* | 11/2008 | Stephens | ............... | H04L 1/0003 370/329 |
| 7,551,581 B2 | 6/2009 | Stephens et al. | | |
| 7,782,806 B2 | 8/2010 | Vrcelj et al. | | |
| 8,279,740 B2* | 10/2012 | Wentink | ............... | H04W 74/02 370/204 |
| 8,761,234 B2 | 6/2014 | Merlin | | |
| 8,830,886 B2* | 9/2014 | Ekbatani | .................. | H04B 7/10 370/310 |
| 8,867,574 B2 | 10/2014 | Van Nee et al. | | |
| 8,902,799 B2* | 12/2014 | Sutton | ............... | H04W 52/0225 370/311 |
| 8,929,482 B2* | 1/2015 | Kwon | ................. | H04L 25/0204 375/295 |
| 8,964,896 B2* | 2/2015 | Lee | ........................ | H04L 45/74 375/302 |
| 8,982,889 B2* | 3/2015 | Zhang | ................ | H04L 1/0025 370/392 |
| 9,001,815 B2 | 4/2015 | Lakkis | | |
| 9,001,929 B2* | 4/2015 | Lee | .................... | H04L 27/2602 375/254 |
| 9,071,296 B2* | 6/2015 | Kwon | ................. | H04L 25/0204 |
| 9,094,944 B2* | 7/2015 | Wentink | ................ | H04W 74/02 |
| 9,197,683 B2 | 11/2015 | Fwu et al. | | |
| 9,385,911 B2 | 7/2016 | Vermani et al. | | |
| 9,398,123 B2* | 7/2016 | Vermani | ............ | H04W 28/065 |
| 9,462,503 B2* | 10/2016 | Miller | ................ | H04B 7/18523 |
| 9,479,298 B2* | 10/2016 | Raaf | .................... | H04W 48/16 |
| 9,655,112 B2* | 5/2017 | Ghosh | ............. | H04W 72/0446 |
| 9,660,760 B2* | 5/2017 | Kasher | ................. | H04L 1/0005 |
| 9,712,362 B2 | 7/2017 | Oh et al. | | |
| 9,729,368 B2* | 8/2017 | Suh | ..................... | H04L 27/2602 |
| 9,730,229 B2 | 8/2017 | Lee et al. | | |
| 9,742,531 B2* | 8/2017 | Raaf | ............... | H04W 48/16 |
| 9,749,087 B2* | 8/2017 | Cordeiro | ............. | H04L 1/0003 |
| 9,806,776 B2* | 10/2017 | Kwon | ............. | H04L 25/0204 |
| 9,826,435 B2 | 11/2017 | Kasher et al. | | |
| 9,876,544 B2* | 1/2018 | Cordeiro | ............. | H04B 7/0452 |
| 9,906,282 B2* | 2/2018 | Cordeiro | ............. | H04B 7/0452 |
| 9,924,541 B2* | 3/2018 | Choi | ................ | H04W 74/0816 |
| 9,949,259 B2* | 4/2018 | Eitan | ............... | H04W 72/0446 |
| 9,954,595 B2 | 4/2018 | Sanderovich et al. | | |
| 10,021,695 B2* | 7/2018 | Eitan | ..................... | H04L 1/0079 |
| 10,631,203 B2* | 4/2020 | Huang | ................... | H04L 1/005 |
| 2002/0104067 A1 | 8/2002 | Green et al. | | |
| 2004/0136339 A1* | 7/2004 | Wentink | ................ | H04W 74/02 370/329 |
| 2005/0032514 A1 | 2/2005 | Sadri et al. | | |
| 2005/0136933 A1 | 6/2005 | Sandhu et al. | | |
| 2008/0122667 A1* | 5/2008 | Bentvelsen | ...... | G11B 20/00086 341/106 |
| 2009/0129283 A1* | 5/2009 | Kwon | .................... | H04L 43/50 370/252 |
| 2009/0225734 A1 | 9/2009 | Stephens et al. | | |
| 2009/0285240 A1* | 11/2009 | Zhang | ................ | H04J 13/0014 370/476 |
| 2009/0316815 A1* | 12/2009 | Glazko | ................ | H04L 5/0037 375/260 |
| 2010/0008436 A1 | 1/2010 | Zhang et al. | | |
| 2010/0061320 A1* | 3/2010 | Lakkis | ................ | H04L 27/2602 370/329 |
| 2010/0115372 A1 | 5/2010 | Trachewsky et al. | | |
| 2010/0162078 A1* | 6/2010 | Miller | ................... | H04L 1/0003 714/755 |
| 2010/0260159 A1 | 10/2010 | Zhang et al. | | |
| 2011/0051705 A1 | 3/2011 | Jones, IV et al. | | |
| 2011/0103516 A1* | 5/2011 | Bao | ........................ | H04L 1/0041 375/308 |
| 2011/0170627 A1 | 7/2011 | Kwon et al. | | |
| 2011/0310929 A1* | 12/2011 | Petite | .................. | H04W 72/082 375/130 |
| 2012/0051454 A1 | 3/2012 | Zheng et al. | | |
| 2012/0163292 A1 | 6/2012 | Kneckt et al. | | |
| 2012/0213305 A1 | 8/2012 | Oh et al. | | |
| 2012/0243430 A1* | 9/2012 | Song | ...................... | H04L 1/0015 370/252 |
| 2012/0327832 A1* | 12/2012 | Wentink | ................ | H04W 74/02 370/311 |
| 2013/0086665 A1 | 4/2013 | Filippi et al. | | |
| 2013/0115955 A1 | 5/2013 | Deng et al. | | |
| 2013/0121229 A1* | 5/2013 | Vare | ....................... | H04H 20/22 370/312 |
| 2013/0136010 A1* | 5/2013 | Miller | ................ | H04B 7/18523 370/246 |
| 2013/0148553 A1* | 6/2013 | Ekbatani | ................ | H04B 7/10 370/310 |
| 2013/0208715 A1 | 8/2013 | Roh et al. | | |
| 2014/0219318 A1* | 8/2014 | Hamaguchi | ........... | H04L 5/0091 375/130 |
| 2014/0254713 A1* | 9/2014 | Kwon | ................ | H04L 25/0204 375/295 |
| 2014/0286203 A1 | 9/2014 | Jindal et al. | | |
| 2014/0335882 A1 | 11/2014 | Lee et al. | | |
| 2014/0341118 A1* | 11/2014 | Lee | ......................... | H04L 45/74 370/329 |
| 2014/0362840 A1* | 12/2014 | Wong | ................. | H04W 88/06 370/338 |
| 2014/0365848 A1* | 12/2014 | Roh | .................. | H03M 13/2966 714/784 |
| 2015/0009948 A1* | 1/2015 | Raaf | ..................... | H04W 48/16 370/330 |
| 2015/0063295 A1 | 3/2015 | Himayat et al. | | |
| 2015/0071248 A1 | 3/2015 | Faerber et al. | | |
| 2015/0085947 A1* | 3/2015 | Kwon | ................. | H04L 25/0204 375/267 |
| 2015/0124677 A1* | 5/2015 | Asterjadhi | ............ | H04L 1/0025 370/311 |
| 2015/0163687 A1 | 6/2015 | Lee et al. | | |
| 2015/0280799 A1* | 10/2015 | Kwon | ................. | H04L 25/0204 375/267 |
| 2016/0150591 A1 | 5/2016 | Tarighat et al. | | |
| 2016/0192433 A1 | 6/2016 | Deenoo et al. | | |
| 2016/0241425 A1 | 8/2016 | Xin et al. | | |
| 2016/0278032 A1 | 9/2016 | Yi et al. | | |
| 2016/0309457 A1* | 10/2016 | Eitan | ..................... | H04L 1/0079 |

(56) References Cited

U.S. PATENT DOCUMENTS

| | | | |
|---|---|---|---|
| 2016/0323058 A1* | 11/2016 | Cordeiro | H04L 1/0003 |
| 2016/0323861 A1* | 11/2016 | Cordeiro | H04B 7/0452 |
| 2016/0323878 A1* | 11/2016 | Ghosh | H04W 72/0446 |
| 2016/0373557 A1 | 12/2016 | Sikkink et al. | |
| 2017/0027001 A1* | 1/2017 | Choi | H04W 74/0816 |
| 2017/0041109 A1* | 2/2017 | Raaf | H04W 48/16 |
| 2017/0048918 A1 | 2/2017 | Iwamura et al. | |
| 2017/0111139 A1 | 4/2017 | Greenberg et al. | |
| 2017/0126303 A1 | 5/2017 | Jo et al. | |
| 2017/0134928 A1* | 5/2017 | Eitan | H04B 7/02 |
| 2017/0164348 A1 | 6/2017 | Agiwal et al. | |
| 2017/0187439 A1 | 6/2017 | Park et al. | |
| 2017/0207833 A1* | 7/2017 | Cordeiro | H04B 7/0452 |
| 2017/0208154 A1 | 7/2017 | Park et al. | |
| 2017/0223571 A1* | 8/2017 | Ghosh | H04W 72/0446 |
| 2017/0257193 A1 | 9/2017 | Yan et al. | |
| 2017/0257835 A1 | 9/2017 | Wu et al. | |
| 2017/0280354 A1 | 9/2017 | Huang et al. | |
| 2017/0280363 A1 | 9/2017 | Tenny et al. | |
| 2017/0317784 A1 | 11/2017 | Kasher et al. | |
| 2017/0324599 A1* | 11/2017 | Lomayev | H04L 27/2613 |
| 2018/0262240 A1* | 9/2018 | Cordeiro | H04B 7/0452 |
| 2019/0081819 A1* | 3/2019 | Kasher | H04B 7/0695 |
| 2019/0190637 A1* | 6/2019 | Lomayev | H04L 23/02 |
| 2019/0199499 A1* | 6/2019 | Da Silva | H04L 27/2602 |

FOREIGN PATENT DOCUMENTS

| | | | |
|---|---|---|---|
| CO | 6852029 A2 | 1/2014 | |
| EP | 3258625 A1 * | 12/2017 | H04W 84/12 |
| EP | 3258625 A4 * | 2/2018 | H04W 84/12 |
| KR | 20120018785 A | 3/2012 | |
| RU | 2683854 C1 * | 4/2019 | H04L 1/0079 |
| TW | 201412066 A | 3/2014 | |
| WO | WO-0002401 A2 * | 1/2000 | H04L 1/0007 |
| WO | 2005018180 A1 | 2/2005 | |
| WO | 2006099222 A1 | 9/2006 | |
| WO | 2006120979 A1 | 11/2006 | |
| WO | 2008098672 A1 | 8/2008 | |
| WO | 09059229 | 5/2009 | |
| WO | 2011153335 A1 | 12/2011 | |
| WO | 2012158557 A1 | 11/2012 | |
| WO | 2013063303 | 5/2013 | |
| WO | WO-2016049817 A1 * | 4/2016 | H04L 25/0228 |

OTHER PUBLICATIONS

Taiwan Search Report—TW105109044—TIPO—dated Nov. 20, 2018.
Alecsander E., et al., "PHY Frame Format Proposal for 11ay", IEEE 802.11-1610061-00-00, Jan. 18, 2016, 9 pages.
International Search Report and Written Opinion—PCT/US2016/022296—ISA/EPO—dated Jun. 29, 2016.
Lanante L., et al., "IEEE802.11ac Preamble with Legacy 802.11a/n Backward Compatibility", IEEE 802.11-YY/0847R0, Jul. 14, 2009 (Jul. 14, 2009), pp. 1-18, XP002606794, Retrieved from the Internet: URL: http://www.google.de/url"sa=t&source=web&cd=3&ved=0CBgQFjAC&url=https%3A%2F%2Fmentor.ieee.org%2F802.11%2Fdcn%2F10%2F11-10-0791-02-00ac-pha se-rotation-for-the-80-mhz-802-11ac-mixed-mode-packet.ppt&ei=u3bFT07TE8qh4QbZko26Aw&usg=AFQjCNHYliVI8HNnsZmesHd33saVGqWpOw [retrieved on Oct. 25, 2010].
Selda U.G., et al., "Optimal Guard-Band-Aware Channel Assignment with Bonding and Aggregation in Multi-Channel Systems", 2013 IEEE Globecom Workshops (GC WKSHPS), IEEE, Dec. 9, 2013 (Dec. 9, 2013), pp. 4769-4774, XP032619486, DOI: 10.1109/GLOCOMW.2013.6855705 [retrieved on Jul. 14, 2014] Section I.

* cited by examiner

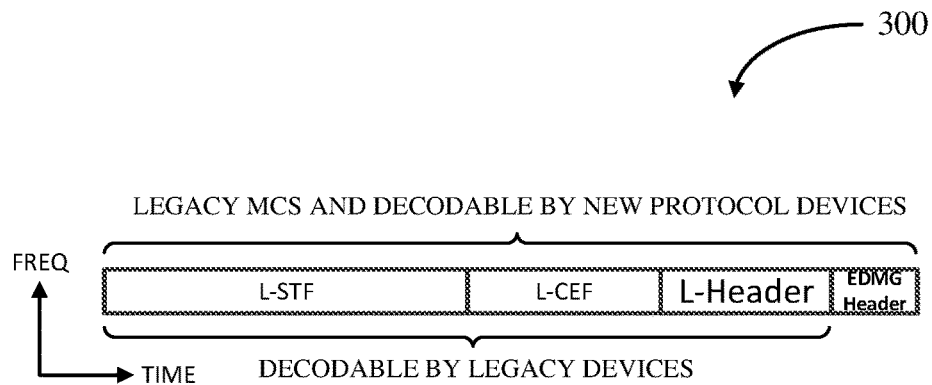

FIG. 3A

| Description | Bits | Notes |
|---|---|---|
| Payload data Length | 24 | |
| EDMG Header Number of LDPC blocks | Bits | Value is +1 (when this field is 0, it means 1 LDPC block) |
| Spatial streams | 4 | 1 ... 16 |
| Channels | 3 | 1 ... 8 |
| Channel Offset | 3 | 0 ... 7 (The offset of this channel in the channel bonding) |
| 11ay MCS | 6 | |
| GI mode | 1 | Short or Long GI |
| FFT mode | 1 | Short or Long FFT |
| LDPC mode | 1 | Short (same as 11ad) or Long |
| Long CES | 1 | Indicate long channel estimation sequence |
| Power difference | 4 | 0 ... 15 dB |
| Reserved bits | 22 | |
| Proprietary bits | 8 | |
| CRC | 16 | |
| Total | 104 | bits |

FIG. 3B

APPARATUS AND METHOD FOR RECEIVING DATA FRAMES

CROSS-REFERENCE TO A RELATED APPLICATION

The present Application for Patent is a continuation application of Non-Provisional application Ser. No. 15/009,733 filed in the U.S. Patent and Trademark Office on Jan. 28, 2016, the entire content of which is incorporated herein by reference as if fully set forth below in its entirety and for all applicable purposes. Non-Provisional application Ser. No. 15/009,733 claims priority to and the benefit of provisional patent application No. 62/147,479 filed in the U.S. patent office on Apr. 14, 2015, the entire content of which is incorporated herein by reference.

FIELD

Certain aspects of the present disclosure generally relate to wireless communications and, more particularly, to transmitting and receiving enhanced frames for transmission of orthogonal frequency division multiplexing (OFDM) signals, single carrier wideband (SC WB) signals, aggregated single carrier (SC) signals, OFDM MIMO (spatial) signals, SC WB MIMO (spatial) signals, and aggregated SC MIMO (spatial) signals.

BACKGROUND

This document is a Concept Design of suggested Frame Format for a currently-developed new protocol, which is being referred to as NG60 (Next Generation 60 GHz), or also known as Institute of Electrical and Electronics Engineers (IEEE) 802.11ay. It is a development on top of the existing standard IEEE 802.11ad (in the past also known as "WiGig").

The main goal of the new standard or protocol is to increase the throughput, and extend coverage as well as lower power consumption (e.g., average energy per bit). It is also clear that the new standard shall be backward compatible and should allow 802.11ad (legacy) devices to coexist in the same environment.

SUMMARY

Certain aspects of the present disclosure provide an apparatus for wireless communications. The apparatus comprises a processing system configured to generate a frame comprising a preamble, a first header, and a second header, wherein the preamble and the first header are configured to be decoded by a first device operating according to a first protocol, the second header not being configured to be decoded by the first device, and wherein the preamble, the first header, and the second header are configured to be decoded by a second device operating according to a second protocol; and an interface configured to output the frame for transmission by way of the at least one antenna.

Certain aspects of the present disclosure provide a method for wireless communications. The method comprises generating a frame comprising a preamble, a first header, and a second header, wherein the preamble and the first header are configured to be decoded by a first device operating according to a first protocol, the second header not being configured to be decoded by the first device, and wherein the preamble, the first header, and the second header are configured to be decoded by a second device operating according to a second protocol; and outputting the frame for transmission.

Certain aspects of the present disclosure provide an apparatus for wireless communications. The apparatus comprises means for generating a frame comprising a preamble, a first header, and a second header, wherein the preamble and the first header are configured to be decoded by a first device operating according to a first protocol, the second header not being configured to be decoded by the first device, and wherein the preamble, the first header, and the second header are configured to be decoded by a second device operating according to a second protocol; and means for outputting the frame for transmission.

Certain aspects of the present disclosure provide a computer readable medium having instructions stored thereon for generating a frame comprising a preamble, a first header, and a second header, wherein the preamble and the first header are configured to be decoded by a first device operating according to a first protocol, the second header not being configured to be decoded by the first device, and wherein the preamble, the first header, and the second header are configured to be decoded by a second device operating according to a second protocol; and outputting the frame for transmission.

Certain aspects of the present disclosure provide a wireless node. The wireless node comprises at least one antenna, a processing system configured to generate a frame comprising a preamble, a first header, and a second header, wherein the preamble and the first header are configured to be decoded by a first device operating according to a first protocol, the second header not being configured to be decoded by the first device, and wherein the preamble, the first header, and the second header are configured to be decoded by a second device operating according to a second protocol; and an interface configured to output the frame for transmission by way of the at least one antenna.

Aspects of the present disclosure also provide various methods, means, and computer program products corresponding to the apparatuses and operations described above.

BRIEF DESCRIPTION OF THE DRAWINGS

FIG. 3A illustrates an exemplary frame or frame portion in accordance with certain aspects of the present disclosure.

FIG. 3B illustrates an exemplary Extended Directional Multigigabit (EDMG) Header in accordance with certain aspects of the present disclosure.

DETAILED DESCRIPTION

Figure 1:
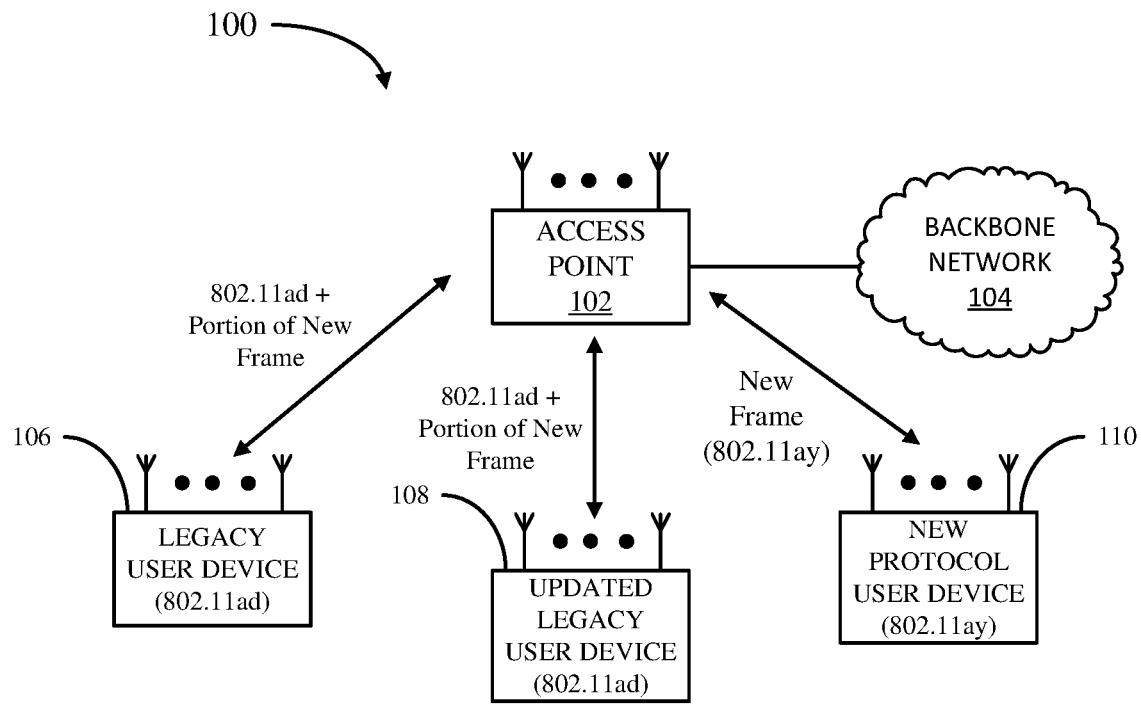
FIG. 1 is a diagram of an exemplary wireless communications network in accordance with certain aspects of the present disclosure.

Aspects of the present disclosure provide techniques for performing channel estimation of a bonded channel formed by bonding a plurality of channels by using channel estimation training sequences transmitted in each of the plurality of channels.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

With reference to the following description, it shall be understood that not only communications between access points and user devices are allowed, but also direct (e.g., peer-to-peer) communications between respective user devices are allowed. Furthermore, a device (e.g., an access point or user device) may change its behavior between a user device and an access point according to various conditions. Also, one physical device may play multiple roles: user device and access point, multiple user devices, multiple access points, for example, on different channels, different time slots, or both.

FIG. 1 illustrates a block diagram of an exemplary wireless communications network 100 in accordance with certain aspects of the present disclosure. The communications network 100 comprises an access point 102, a backbone network 104, a legacy user device 106, an updated legacy user device 108, and a new protocol user device 110.

The access point 102, which may be configured for a wireless local area network (LAN) application, may facilitate data communications between the user devices 106, 108, and 110. The access point 102 may further facilitate communications data communications between devices coupled to the backbone network 104 and any one or more of the user devices 106, 108, and 110.

In this example, the access point 102 and the legacy user device 106 data communicate between each other using a legacy protocol. One example of a legacy protocol includes Institute of Electrical and Electronics Engineers (IEEE) 802.11ad. According to this protocol, data communications between the access point 102 and the legacy user device 106 are effectuated via transmission of data frames that comply with the 802.11ad protocol. As discussed further herein, an 802.11ad data frame includes a preamble consisting of a short training field (STF) sequence and a channel estimation (CE) sequence, a header, a payload data, and an optional beamforming training field.

The STF sequence includes a plurality of concatenated Golay sequences ($Ga_{128}$) followed by a negative Golay sequence ($-Ga_{128}$) to signify the end of the STF sequence. The STF sequence may assist a receiver in setting up its automatic gain control (AGC), timing, and frequency setup for accurately receiving the rest of the frame and subsequent frames.

In the case of a single carrier (SC) transmission mode, the CEF includes a $Gu_{512}$ sequence (consisting of the following concatenated Golay sequences ($-Gb_{128}$, $-Ga_{128}$, $Gb_{128}$, $-Ga_{128}$) followed by a $Gv_{512}$ sequence (consisting of the following concatenated Golay sequences ($-Gb_{128}$, $Ga_{128}$, $-Gb_{128}$, $-Ga_{128}$), and ending with a $Gv_{128}$ (same as $-Gb_{128}$) sequence. In the case of an orthogonal frequency division multiplexing (OFDM) transmission mode, the CEF includes a $Gv_{512}$ sequence followed by a $Gu_{512}$ sequence, and ending with a $Gv_{128}$ sequence. The CEF assists the receiver in estimating the transfer function or frequency response to a channel through which the 802.11ad data frame is transmitted.

The header 802.11ad data frame includes information about the frame. Such information includes a scrambler initiation field, which specifies a seed for the scrambling applied to the remainder of the header and the payload data for data whitening purposes. The header also includes the modulation and coding scheme (MCS) field to indicate one out of 12 defined MCS used for transmitting the payload data portion of the transmitted signal. The header includes a length field to indicate the length of the payload data in octets. The header further includes a training length field to indicate a length of the optional beam forming training sequence at the end of the frame. Additionally, the header includes a packet type field to indicate whether the optional beam forming field pertains to transmission or reception. Further, the header includes a header checksum (HCS) field to indicate a cyclic redundancy code (CRC) (e.g., CRC-32) checksum over the header bits.

Referring again to FIG. 1, the legacy user device 106 is capable of decoding the entire 802.11ad data frame. The new frame disclosed herein, which may be subsequently adopted for a new standard or protocol, such as the currently-in-development IEEE 802.11ay, provides some backward compatibility feature. As discussed in more detail herein, the new frame includes the preamble (the STF and the CEF) and the header of the 802.11ad, but one or more additional portions pertaining to the proposed new protocol. Accordingly, the legacy user device 106 is configured to decode the 802.11ad preamble and header portion of the new frame, but is not configured to decode the remaining portion of the new frame. The legacy user device 106 may decode the data in the length field of the legacy header portion of the new frame in order to calculate a network allocation vector (NAV) to determine the length of the new frame for transmission collision avoidance purposes.

The updated legacy user device 108 also operates under the legacy 802.11ad protocol, and is able to communicate with the access point 102 using 802.11ad data frames. However, the frame processing capability of the updated legacy user device 108 has been updated to interpret certain bits in the legacy header of the new frame that indicate an attribute of the new frame, as discussed further herein. In accordance with the legacy 802.11ad protocol, these bits are allocated to one or more least significant bits (LSB) of the data length in the legacy header. That is, in accordance with the new frame, the allocated LSB of the data length field of the legacy header portion are used to indicate a transmission power difference between a first portion of the new frame and a second portion of the new frame in accordance with a certain transmission mode associated with the new frame. These bits allow the updated legacy user device to anticipate the power difference (an increase) for signal interference management purposes. Although in this example, the allocation of the LSB length bits signify the aforementioned power difference, it shall be understood that these bits may be allocated for other purposes.

The new protocol user device 110 is capable of communicating with the access point 102 using the new data frame, which some or all features of the new frame may be adopted for the currently-under-development 802.11ay protocol. As discussed further herein, the new data frame includes the legacy 802.11ad preamble and header, with the legacy header slightly modified to indicate the transmission mode associated with the new frame and, as previously discussed, a transmission power difference between a first portion of the new frame and a second portion of the new frame. The slight modification to the legacy header portion of the new frame may not impact the decoding of the legacy header by the legacy user device 106 and the updated legacy user device 108. For instance, the bits in the legacy header portion of the new frame to indicate the transmission mode are reserved bits in the standard 802.11ad legacy header.

In addition to the legacy preamble and header portion, the new frame further comprises an extended header. As discussed in more detail herein, the extended header comprises a plurality of fields for indicating various attributes for the new frame. Such attributes includes payload data length, number of low density parity check (LDPC) data blocks appended to the extended header, the number of spatial streams, the number of bonded channels, the leftmost (lowest frequency) channel of the bonded channels, the MCS for the payload data of the new frame, the transmit power difference between different portion of the frame, and other information. As mentioned above, the extended header may further be appended with payload data that is not in the payload portion of the new frame. For short messages, all of the payload data may appended to the extended header, thereby avoiding the need for transmitting the "separate" payload data portion of the new frame, which adds significant overhead to the frame.

The new data frame is configured to provide additional features to improve data throughput by employing higher data modulation schemes, channel bonding, channel aggregation, and improved spatial transmission via multiple input multiple output (MIMO) antenna configurations. For instance, the legacy 802.11ad protocol includes BPSK, QPSK, and 16QAM available modulation schemes. According to the new protocol, higher modulation schemes, such as 64QAM, 64APSK, 128APSK, 256QAM, and 256APSK are available. Additionally, a plurality of channels may be bonded or aggregated to increase data throughput. Further, such bonded or aggregated channels may be transmitted by way of a plurality of spatial transmissions using a MIMO antenna configuration.

Figure 2A:
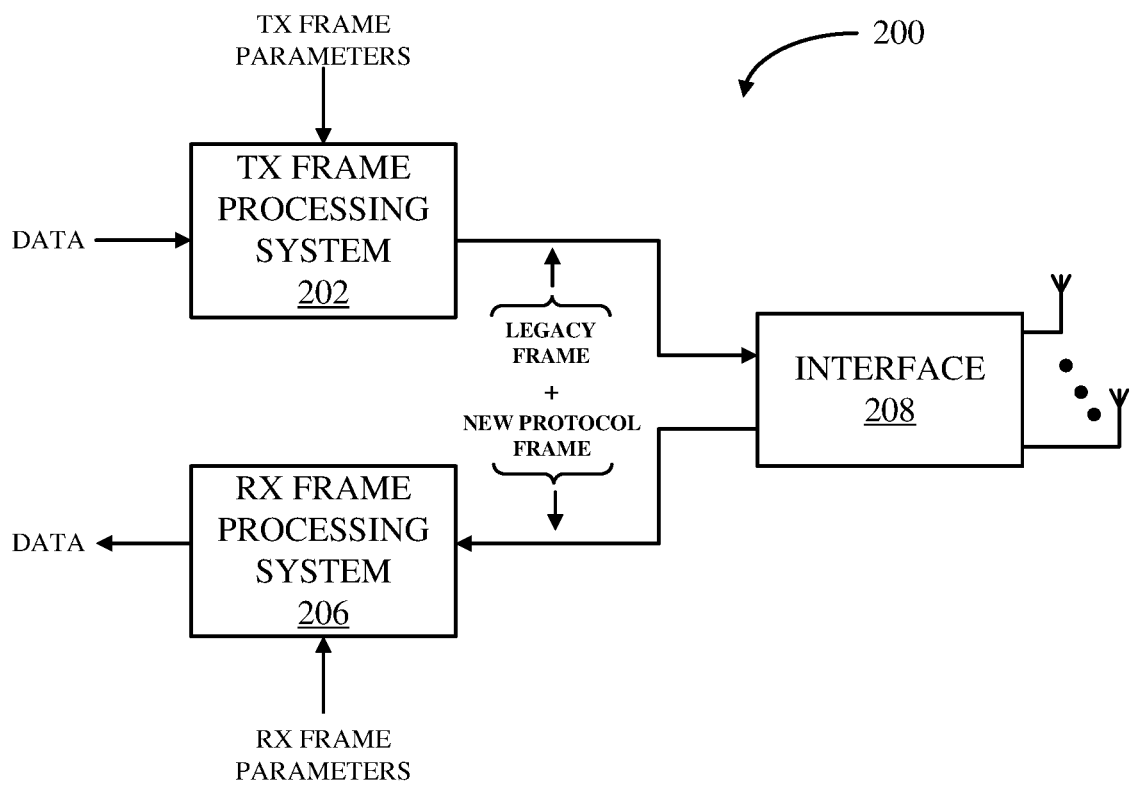
FIG. 2A is a block diagram of an exemplary access point or user device in accordance with certain aspects of the present disclosure.

FIG. 2A illustrates a block diagram of an exemplary apparatus 200 for wireless communications in accordance with certain aspects of the present disclosure. The apparatus 200 may be an exemplary implementation of the access point 102, legacy user device 106, updated legacy user device 108, and new protocol user device 110, previously discussed. The apparatus 200 comprises a transmit (Tx) frame processing system 202, a receive (Rx) frame processing system 206, and an interface 208 coupled to one or more antennas.

The Tx frame processing system 202 receives data for transmission to a remote device, and parameters for specifying the Tx frame supporting the data. Based on the Tx frame parameters, the Tx frame processing system 202 generates a transmit frame including the data intended for the remote device. The interface 208 is configured to output the transmit frame for transmission to a remote device by way of one or more antennas. In the case of multiple antennas, the interface 208 may output the transmit frame for transmission via spatial transmissions with the antennas being in a MIMO configuration.

The interface 208 is also configured to receive a signal including a data frame transmitted by a remote device. The interface 208 receives the signal by way of the one or more antennas. In the case of multiple antennas, the signal may be received in a spatial or directional manner with the antennas being in a MIMO configuration. The interface 208 outputs the data frame to the Rx frame processing system 206. The Rx frame processing system 206 receives frame parameters associated with the received data frame, and processes the frame to produce the data included in the frame.

In the case where the apparatus 200 is an exemplary implementation of the of the access point 102, which, in this example, is capable of communicating with user devices using the 802.11ad legacy protocol and the new 802.11ay protocol, the Tx frame processing system 202 and Rx frame processing system 206 are configured to process both 802.11ad legacy and the new 802.11ay protocol transmit and receive frames.

Similarly, in the case where the apparatus 200 is an exemplary implementation of the new protocol user device 110, which, in this example, is capable of communicating with the access point 102 using the 802.11ad legacy protocol and the new 802.11ay protocol, the Tx frame processing system 202 and Rx frame processing system 206 are configured to process both 802.11ad legacy and the new 802.11ay protocol transmit and receive frames. It shall be understood that the new protocol user device 110 need not be configured for processing the legacy 802.11ad frames, but may be done so that the user device 110 is capable of communicating with 802.11ad access points or other 11ad devices.

In the case where the apparatus 200 is an exemplary implementation of the of the legacy 802.11ad user device 106, which, in this example, is capable of only communicating with the access point 102 using the 802.11ad legacy protocol, the Tx frame processing system 202 and Rx frame processing system 206 are configured to process 802.11ad legacy transmit and receive frames for transmitting and receiving data, and not the new 802.11ay protocol frame. However, the legacy 802.11ad user device 106 may be configured to receive and decode the legacy header portions of the new protocol frame to, for example, calculate a network allocation vector (NAV) to determine a duration of the new protocol frame for the purpose of avoiding transmission collision and determining when the communication medium is available for transmission of a legacy 802.11ad frame.

The description in previous paragraph applies to the updated legacy user device 108. However, as previously discussed, the updated legacy user device 108 may be configured to decode certain bits in the legacy header portion of the new protocol frame. Such bits may be reserved bits and reallocated bits in the legacy 802.11ad frame. These bits indicate the transmission mode of the new frame and the transmit power difference between a first portion of the new frame (e.g., the legacy preamble and header, and an extended header per the new frame protocol) and a second portion of the new frame (e.g., a new protocol preamble, payload data, and optional beam training sequence (TRN)) in a single carrier wideband (SC WB) transmission mode in accordance with the new protocol, as discussed in more detail herein. The update legacy user device 108 uses the information in those bits to anticipate a power increase for interference management purposes.

Figure 2B:
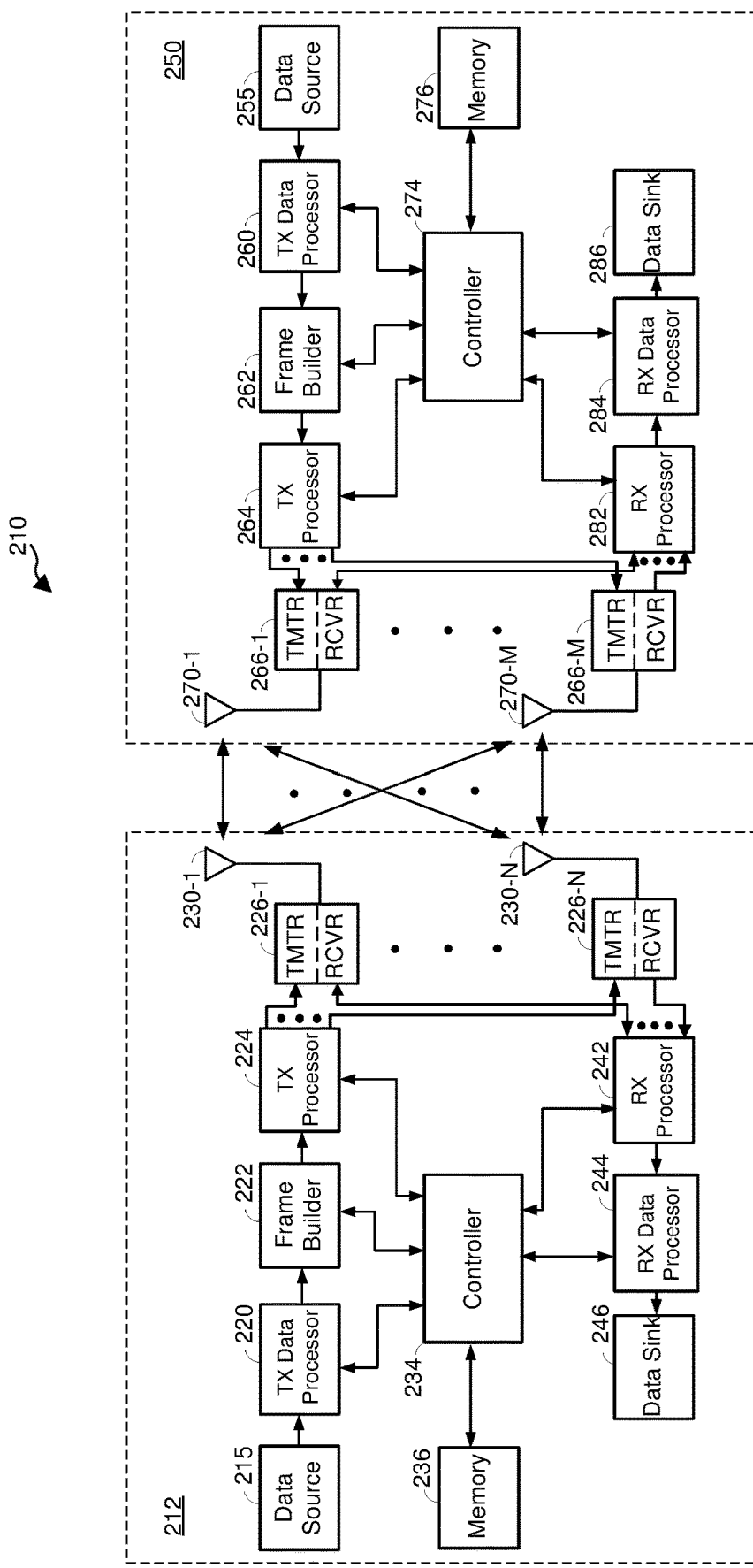
FIG. 2B illustrates a block diagram of an access point (generally, a first wireless node) and a user device (generally, a second wireless node) in accordance with certain aspects of the present disclosure.

FIG. 2B illustrates a block diagram of a wireless communication network 210 including an access point 212 (generally, a first wireless node) and a user device 250 (generally, a second wireless node). The access point 212 is a transmitting entity for the downlink and a receiving entity for the uplink. The user device 250 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel.

It shall be understood that the access point 212 may alternatively be a user device, and the user device 250 may alternatively be an access point.

For transmitting data, the access point 212 comprises a transmit data processor 220, a frame builder 222, a transmit processor 224, a plurality of transceivers 226-1 to 226-N, and a plurality of antennas 230-1 to 230-N. The access point 212 also comprises a controller 234 for controlling operations of the access point 212.

In operation, the transmit data processor 220 receives data (e.g., data bits) from a data source 215, and processes the data for transmission. For example, the transmit data processor 220 may encode the data (e.g., data bits) into encoded data, and modulate the encoded data into data symbols. The transmit data processor 220 may support different modulation and coding schemes (MCSs). For example, the transmit data processor 220 may encode the data (e.g., using low-density parity check (LDPC) encoding) at any one of a plurality of different coding rates. Also, the transmit data processor 220 may modulate the encoded data using any one of a plurality of different modulation schemes, including, but not limited to, BPSK, QPSK, 16QAM, 64QAM, 64APSK, 128APSK, 256QAM, and 256APSK.

In certain aspects, the controller 234 may send a command to the transmit data processor 220 specifying which modulation and coding scheme (MCS) to use (e.g., based on channel conditions of the downlink), and the transmit data processor 220 may encode and modulate data from the data source 215 according to the specified MCS. It is to be appreciated that the transmit data processor 220 may perform additional processing on the data such as data scrambling, and/or other processing. The transmit data processor 220 outputs the data symbols to the frame builder 222.

The frame builder 222 constructs a frame (also referred to as a packet), and inserts the data symbols into a payload data of the frame. The frame may include a legacy (first) preamble (e.g., STF and CEF), a legacy header, an extended header, a new protocol (second) preamble (e.g., second STF and CEF), a payload data, and an optional beam training sequence (TRN). The preamble may include a short training field (STF) sequence and a channel estimation field (CEF) to assist the user device 250 in receiving the frame. The legacy and extended header may include information related to the data in the payload such as the length of the data and the MCS used to encode and modulate the data. This information allows the user device 250 to demodulate and decode the data. The data in the payload may be divided among a plurality of blocks, wherein each block may include a portion of the data and a guard interval (GI) to assist the receiver with phase tracking. The frame builder 222 outputs the frame to the transmit processor 224.

The transmit processor 224 processes the frame for transmission on the downlink. For example, the transmit processor 224 may support different transmission modes such as an orthogonal frequency-division multiplexing (OFDM) transmission mode and a single-carrier (SC) transmission mode. In this example, the controller 234 may send a command to the transmit processor 224 specifying which transmission mode to use, and the transmit processor 224 may process the frame for transmission according to the specified transmission mode. The transmit processor 224 may apply a spectrum mask to the frame so that the frequency constituent of the downlink signal meets certain spectral requirements.

In certain aspects, the transmit processor 224 may support multiple-output-multiple-input (MIMO) transmission. In these aspects, the access point 212 may include multiple antennas 230-1 to 230-N and multiple transceivers 226-1 to 226-N (e.g., one for each antenna). The transmit processor 224 may perform spatial processing on the incoming frames and provide a plurality of transmit frame streams for the plurality of antennas. The transceivers 226-1 to 226-N receive and processes (e.g., converts to analog, amplifies, filters, and frequency upconverts) the respective transmit frame streams to generate distinct spatially-diverse transmit signals for transmission via the antennas 230-1 to 230-N, respectively.

For transmitting data, the user device 250 comprises a transmit data processor 260, a frame builder 262, a transmit processor 264, a plurality of transceivers 266-1 to 266-M, and a plurality of antennas 270-1 to 270-M (e.g., one antenna per transceiver). The user device 250 may transmit data to the access point 212 on the uplink, and/or transmit data to another user device (e.g., for peer-to-peer communication). The user device 250 also comprises a controller 274 for controlling operations of the user device 250.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs a frame, and inserts the received data symbols into a payload data of the frame. The frame may include a legacy preamble, a legacy header, an extended header, a new protocol preamble, a payload data, and an optional beam training sequence (TRN). The legacy and the new protocol preamble may each include an STF and a CEF to assist the access point 212 and/or other user device in receiving the frame. The legacy and extended header may include information related to the data in the payload such as the length of the data and the MCS used to encode and modulate the data. The data in the payload may be divided among a plurality of blocks where each block may include a portion of the data and a guard interval (GI) assisting the access point and/or other user device with phase tracking. The frame builder 262 outputs the frame to the transmit processor 264.

The transmit processor 264 processes the frame for transmission. For example, the transmit processor 264 may support different transmission modes such as an OFDM transmission mode and an WB SC transmission mode. In this example, the controller 274 may send a command to the transmit processor 264 specifying which transmission mode to use, and the transmit processor 264 may process the frame for transmission according to the specified transmission mode. The transmit processor 264 may apply a spectrum mask to the frame so that the frequency constituent of the uplink signal meets certain spectral requirements.

The transceivers 266-1 to 266-M receive and processes (e.g., converts to analog, amplifies, filters, and frequency upconverts) the output of the transmit processor 264 for transmission via the one or more antennas 270-1 to 270-M. For example, the transceiver 266-1 to 266-M may upconvert the output of the transmit processor 264 to a transmit signal having a frequency in the 60 GHz range.

In certain aspects, the transmit processor 264 may support multiple-output-multiple-input (MIMO) transmission. In these aspects, the user device 250 may include multiple antennas 270-1 to 270-M and multiple transceivers 266-1 to 266-M (e.g., one for each antenna). The transmit processor 264 may perform spatial processing on the incoming frame and provide a plurality of transmit frame streams for the plurality of antennas 270-1 to 270-M. The transceivers 266-1 to 266-M receive and process (e.g., converts to analog, amplifies, filters, and frequency upconverts) the respective transmit frame streams to generate distinct spatially-diverse transmit signals for transmission via the antennas 270-1 to 270-M.

For receiving data, the access point 212 comprises a receive processor 242, and a receive data processor 244. In operation, the transceivers 226-1 to 226-N receive a signal (e.g., from the user device 250), and spatially process (e.g., frequency downconverts, amplifies, filters and converts to digital) the received signal.

The receive processor 242 receives the outputs of the transceivers 226-1 to 226-N, and processes the outputs to recover data symbols. For example, the access point 212 may receive data (e.g., from the user device 250) in a frame. In this example, the receive processor 242 may detect the start of the frame using the legacy STF sequence in the preamble of the frame. The receiver processor 242 may also use the STF for automatic gain control (AGC) adjustment. The receive processor 242 may also perform channel estimation (e.g., using the legacy and/or new protocol CEF in the preamble of the frame) and perform channel equalization on the received signal based on the channel estimation.

Further, the receiver processor 242 may estimate phase noise using the guard intervals (GIs) in the payload, and reduce the phase noise in the received signal based on the estimated phase noise. The phase noise may be due to noise from a local oscillator in the user device 250 and/or noise from a local oscillator in the access point 212 used for frequency conversion. The phase noise may also include noise from the channel. The receive processor 242 may also recover information (e.g., MCS scheme) from the header of the frame, and send the information to the controller 234. After performing channel equalization and/or phase noise reduction, the receive processor 242 may recover data symbols from the frame, and output the recovered data symbols to the receive data processor 244 for further processing.

The receive data processor 244 receives the data symbols from the receive processor 242 and an indication of the corresponding MSC scheme from the controller 234. The receive data processor 244 demodulates and decodes the data symbols to recover the data according to the indicated MSC scheme, and outputs the recovered data (e.g., data bits) to a data sink 246 for storage and/or further processing.

As discussed above, the user device 250 may transmit data using an OFDM transmission mode or a WB SC transmission mode. In this case, the receive processor 242 may process the receive signal according to the selected transmission mode. Also, as discussed above, the transmit processor 264 may support multiple-output-multiple-input (MIMO) transmission. In this case, the access point 212 includes multiple antennas 230-1 to 230-N and multiple transceivers 226-1 to 226-N (e.g., one for each antenna). Each transceiver receives and processes (e.g., frequency downconverts, amplifies, filters, frequency upconverts) the signal from the respective antenna. The receive processor 242 may perform spatial processing on the outputs of the transceivers 226-1 to 226-N to recover the data symbols.

For receiving data, the user device 250 comprises a receive processor 282, and a receive data processor 284. In operation, the transceivers 266-1 to 266-M receive a signal (e.g., from the access point 212 or another user device) via the respective antennas 270-1 to 270-M, and process (e.g., frequency downconverts, amplifies, filters and converts to digital) the received signal.

The receive processor 282 receives the outputs of the transceivers 266-1 to 266-M, and processes the outputs to recover data symbols. For example, the user device 250 may receive data (e.g., from the access point 212 or another user device) in a frame, as discussed above. In this example, the receive processor 282 may detect the start of the frame using the legacy STF sequence in the preamble of the frame. The receive processor 282 may also perform channel estimation (e.g., using the legacy and/or the new protocol CEF of the frame) and perform channel equalization on the received signal based on the channel estimation.

Further, the receive processor 282 may estimate phase noise using the guard intervals (GIs) in the payload, and reduce the phase noise in the received signal based on the estimated phase noise. The receive processor 282 may also recover information (e.g., MCS scheme) from the header of the frame, and send the information to the controller 274. After performing channel equalization and/or phase noise reduction, the receive processor 282 may recover data symbols from the frame, and output the recovered data symbols to the receive data processor 284 for further processing.

The receive data processor 284 receives the data symbols from the receive processor 282 and an indication of the corresponding MSC scheme from the controller 274. The receive data processor 284 demodulates and decodes the data symbols to recover the data according to the indicated MSC scheme, and outputs the recovered data (e.g., data bits) to a data sink 286 for storage and/or further processing.

As discussed above, the access point 212 or another user device may transmit data using an OFDM transmission mode or a SC transmission mode. In this case, the receive processor 282 may process the receive signal according to the selected transmission mode. Also, as discussed above, the transmit processor 224 may support multiple-output-multiple-input (MIMO) transmission. In this case, the user device 250 may include multiple antennas and multiple transceivers (e.g., one for each antenna). Each transceiver receives and processes (e.g., frequency downconverts, amplifies, filters, frequency upconverts) the signal from the respective antenna. The receive processor 282 may perform spatial processing on the outputs of the transceivers to recover the data symbols.

As shown in FIG. 2B, the access point 212 also comprises a memory 236 coupled to the controller 234. The memory 236 may store instructions that, when executed by the controller 234, cause the controller 234 to perform one or more of the operations described herein. Similarly, the user device 250 also comprises a memory 276 coupled to the controller 274. The memory 276 may store instructions that, when executed by the controller 274, cause the controller 274 to perform the one or more of the operations described herein.

Frame Format Common to the Enhanced Frames

FIG. 3A illustrates a diagram of an exemplary frame or frame portion 300 in accordance with certain aspects of the disclosure. As described herein, all of the frame formats described herein start with the legacy (e.g., 802.11ad) fields: L-STF+L-CEF+L-Header. These fields may be decodable by legacy user devices and new protocol devices (e.g., access points and user devices). After the legacy fields, the transmission includes one or more various fields that may be part of the new protocol (e.g., the currently-being-developed 802.11ay protocol, also known as "NG60"). According to the new protocol, several options may be used: transmission of the frames using orthogonal frequency division multiplexing (OFDM), single carrier wideband (SC WB), single carrier (SC)-Aggregate, wherein each one has various options and formats. All the aforementioned new protocol options start with an Extended Directional Multigigabit (EDMG) Header with optional appended payload data. Legacy devices may not able to decode the EDMG Header, but new protocol devices are able to decode the EDMG Header.

According to the diagram, the x- or horizontal axis represents time, and the y- or vertical axis represents frequency. As per the legacy (e.g., 802.11ad) protocol for backwards compatibility purposes, the legacy L-STF portion of the frame 300 may have a duration of 1.16 microseconds (μs), the legacy L-CEF portion may have a duration of 0.73 μs, and the legacy L-Header portion may have a duration of 0.58 μs. The EDMG Header may have a duration of 0.29 μs or more. In the case that the frame 300 is a full frame (not a frame portion), the frame 300 may be transmitted via a single frequency legacy channel and include payload data appended to the EDMG Header. Such configuration may be useful for short messages because there is no need for a separate payload data according to the new frame format, which may consume overhead for the transmission.

The legacy L-Header specifies various parameters and may be decoded by all stations (legacy devices, updated legacy devices, new protocol devices, and access points) that are in range. These stations listen when they are waiting to receive a message or prior to transmission. The legacy L-Header specifies the modulation coding scheme (MCS) used in the data transmission and the amount of data that is transmitted. Stations use these two values to compute the entire duration length of any of the new frames described herein (e.g., including the L-STF, L-CES, L-Header, EDMG Header, STF (if included), CEF (if included), and payload data (if included), but excluding the TRN field) to update the network allocation vector (NAV). This is a mechanism that allows stations to know that the medium is going to be used by another device (e.g., an access point or user device), even if they cannot decode the data itself, or even if they are not the intended receiver of the message. The use of NAV is one of the mechanisms to avoid transmitted signal collisions.

In the legacy 802.11ad frame format, data is placed in low density parity check (LDPC) blocks, where the size is according to the code rate, then encoded to a fixed length blocks (e.g., 672 bits). The outcome is concatenated and then split into Fast Fourier Transform (FFT) blocks (blocks of modulation symbols) according to the selected MCS (mainly modulation). At a receiver, the process is reversed. It should be noted that in low data MCSs, one LDPC block will require one or more FFT blocks, while in high data MCSs, one FFT block may host more than one LDPC blocks. This discussion is relevant to the placing of LDPC data appended to the EDMG Header, as described in more detail herein.

FIG. 3B illustrates an exemplary EDMG Header 350 of the frame or frame portion 300 in accordance with certain aspects of the present disclosure. The EDMG Header specifies the transmission frame parameters (MCS, Data length, modes, etc.) that are used by a receiver to be able to receive and decode the transmission frame. There is no need for other stations (not the destination station) to demodulate the EDMG Header. Hence, the EDMG Header and appended data can be transmitted at high MCS that is suitable for the destination station.

The EDMG Header 350 comprises: (1) a Payload data Length field that may include 24 bits to specify the length of the payload data in octets in all concurrent channels, regardless of whether the payload data is appended to the EDMG Header or in the separate payload data portion; (2) an EDMG Header Number of LDPC blocks field that may include 10 bits to specify the number of LDPC data blocks appended to the EDMG Header. When this value is zero (0), it means there is one (1) LDPC block of data in the EDMG Header; (3) a Spatial streams field that may include 4 bits to represent the number (e.g., 1 to 16) of spatial streams that are being transmitted; (4) a Channels field that may include 3 bits to specify the number of bonded channels (e.g., one (1) to (8) 802.11ad frequency channels (as well as additional channels not available in 802.11ad)); and (5) a Channel offset field that may include 3 bits to specify the offset of the first channel of the bonded channels. In other words, the Channel offset identifies the lowest frequency channel among the bonded channels. This value is set to zero (0) when the first channel is the lowest frequency channel among all the available channels, or when only one channel is used (i.e., no channel bonding).

The EDMG Header 350 further comprises: (6) an 11ay MCS field that may include 6 bits to specify the MCS used in the payload data portion of a frame. Note that the data appended to the EDMG Header uses only the legacy 802.11ad MCS (and not the higher MCS that are only available in accordance with the new protocol). The new protocol MCS may include higher throughput modulation schemes beyond those available in 802.11ad, such as 64QAM, 64APSK, 256QAM, and 256 APSK; (7) a GI (Guard Interval) mode field that may include 1 bit to indicate short or long GI. (8) an FFT mode field that may include 1 bit to indicate short or long FFT block. (9) an LDPC mode field that may include 1 bit to signal short or long LDPC block. And (10) a Long CEF field that may include 1 bit that, when set, indicates the use of a long channel estimation sequence for MIMO; in the case that the number of spatial streams is one, this bit is reserved.

The EDMG Header 350 further comprises: (11) a Power difference field that may include 4 bits to indicate a difference in average power between the aggregated transmitted power of the legacy portion (L-STF, L-CEF, and L-Header) and EDMG Header of the new frame, and the SC WB transmission portion of the frame (STF+CEF+payload data). This difference may be vendor specific. Some transmitters will need power backoff between the aggregated portion and the SC WB portion due to PA non-linearity. This value will inform the receiver about the expected power difference to assist the automatic gain control (AGC) setup. For example, the value is coded in dB (e.g., 0000: 0 dB, 0100: 4 dB, 1111: 15 dB or above).

The EDMG Header 350 further comprises: (12) Reserved bits that may include 22 bits that are reserved at this time. Transmitters should set them to 0 at this time. In the future, these bits may be allocated to various needs; (13) Proprietary bits that may include 8 spare bits that can be used by the vendor and do not require interoperability. Receivers should discard these bits unless they know what they are; and (14) a CRC field that may include 16 bits to sign the EDMG Header. This field is to be used by a receiver to validate the correctness of the received EDMG Header. All bits (except the CRC) shall be used to compute the CRC.

The EDMG Header 350 may be sent on each concurrently-transmitted channel having exactly the same content. This duplication can be used by a receiver to increase the correct detection probability. A receiver may use different algorithms: Option1: receiver decodes only one channel (simples but lowest performance); Option2: receiver decodes only one channel at the time. If CRC passes then cease CRC processing for additional channel(s), if not attempt CRC processing for additional channel(s). Option 2 is better at performance than Option 1, but requires serial processing; and Option3: receiver decodes all channels and selects one that has the corrected CRC. Option 3 has the same performance as Option 2, but is faster.

Data Appended to the Extended Header

Receivers, according to the new protocol, need, from a practical aspect, decode the EDMG Header before samples for the second STF, second CEF, and separate payload data can be received. The reason is that the receiver may need to perform some adjustments. For instance, in SC WB transmission mode, the second STF is transmitted in wideband (WB) mode and the receiver front-end needs to be re-configured with new filters and other parameters. The use of the new protocol modulations require some overhead to be used in some cases (e.g., for processing the second STF and/or second CEF). This overhead reduces the efficiency especially in short messages.

Efficient support of the above lead us to suggest to: (1) Use the "spare" period following the EDMG Header to start transmit a particular quantity of payload data to allow the receiver to setup for receiving the SC WB transmission section of the frame; (2) Extend the Data appended to the EDMG Header to at least 2 LDPC blocks and 2 FFT blocks before modulation is changed to the new protocol fields (including the STF and/or the CEF); and an option to extend the data appended to the EDMG Header beyond the minimum (specified above) for improving efficiency for short payload data.

EDMG Header shall be sent on each channel used for any transmission, using the legacy 802.11ad MCS specified in the legacy L-header. The EDMG Header may be appended with payload data (if data is to be sent). The data appended to the EDMG Header may be split (distinct) over all used channels.

If payload data using the new protocol modulations are used in the transmission, then the EDMG Header and appended data should occupy at least two FFT blocks and at least two LDPC blocks (all this is using the legacy MCS). All LDPC blocks may be fully populated in the EDMG Header. Transmitter may extend this portion to more LDPC blocks, up to 1024 LDPC blocks (per channel, all channels use same legacy MCS). The Length of the data appended to the EDMG Header is according to the number of LDPC blocks (specified in the EDMG Header Number of LDPC blocks field in the EDMG Header per channel) multiplied by number of channels, and amount of bits per LDPC blocks. The length of data in the new protocol payload data field is the rest of the data according to the Length specified in the EDMG Header.

If the new protocol modulation is not used in the transmission (e.g., in a short message application), then the EDMG Header and appended payload data (if data is to be sent) should occupy at least one FFT block and at least one LDPC block (all this using the legacy MCS). The payload data should fill the LDPC blocks starting from lowest channel index (e.g., the LDPC block of the lowest-frequency channel is filled first, then the LDPC block of the second lowest-frequency channel is filled, and so on). The Length specified in the EDMG Header refers to the appended payload data that is transmitted following the EDMG Header when no new protocol modulation is used.

The transmitter may select more numbers of LDPC blocks in order to optimize the transmission for short packets (avoiding the new protocol sections, such as the second STF and second CEF overhead). Receiver should compare the data length from these LDPC blocks with the Data Length in the EDMG Header to deduce if there is a new protocol payload data section at all, and if yes, to compute the exact amount of data in the new protocol payload data section alone. Note that the LDPC blocks including the EDMG Header and data are fully populated with data if the new protocol payload data exists.

The FFT block(s) and LDPC block(s) are per channel. The payload data appended to the EDMG Header is split between the channels evenly starting from lowest channel in a round-robin manner per byte. If the entire payload data cannot be confined to the portion appended to the EDMG Header, then this portion first completely filled before data is sent via new protocol payload data section. The data length in the EDMG Header specifies the actual number of octets, regardless of where they are located (e.g., appended to the EDMG Header or in the new protocol payload data section).

The following provides a few non-limiting examples regarding the amount of data available in the data section attached to the EDMG Header for 2 LDPC blocks or 2 FFT blocks:

Case 1: 1 channel & legacy MCS-1 (this may be the case of the least data). In MCS-1, two LDPC blocks may be used. These two blocks host 336 bits and will take three FFT blocks to be transmitted. In this example, the information fields (header data) in the EDMG Header occupy 104 bits. Thus, the payload data appended to the EDMG Header is 232 bits (29 bytes) (i.e., 336 bits–104 bits).

Case 2: 4 channels and legacy MCS-12 (this may be the case of the most data). In MCS-12, two FFT blocks host 3584 coded bits per channel, that can host 5 LDPC blocks. At this code rate, there are 2520 information bits in the 5 LDPC blocks, out of which 104 header bits will be used for EDMG Header. This leaves 2416 bits for payload data in the EDMG Header per channel Hence, in this case, a total of 1214 payload bytes of data may be transmitted via the EDMG Header of the 4 channels.

Case 3: 2 channels and legacy MCS-8 (this may be the case of an intermediate data amount). In MCS-8, two FFT blocks host 1792 coded bits per channel that can hold 2 LDPC blocks. In the two LDPC blocks, there are 1008 information bits, out of which 104 are dedicated to the header information of the EDMG Header. This leaves a total of 904 bits for payload data in the EDMG Header of each channel. For the two channel case, a total of 228 bytes of payload data in the EDMG Headers may be transmitted.

Legacy Header Change to Indicate Transmission Mode

Bits 44 to 46, which are reserved bits in the legacy (e.g., 802.11ad) L-Header, may be used in the legacy L-Header portion of the new protocol frame to signal transmission mode for the new protocol frame. For example, the legacy L-Header portion signals this as a new protocol frame by setting the 3 bits (e.g., bits 44-46) to any value other than all zeros. An example of the bit values and corresponding modes are indicated in the following table:

| Bits | Mode |
|---|---|
| 000 | 802.11ad (legacy Frame) |
| 001 | SC-WB (New Protocol Frame) |
| 010 | SC-Aggregate (New Protocol Frame) |
| 011 | SC-Duplicate (New Protocol Frame) |
| 100 | OFDM (New Protocol Frame) |
| Other | Reserved |

Frame Format for OFDM

Figure 4A:
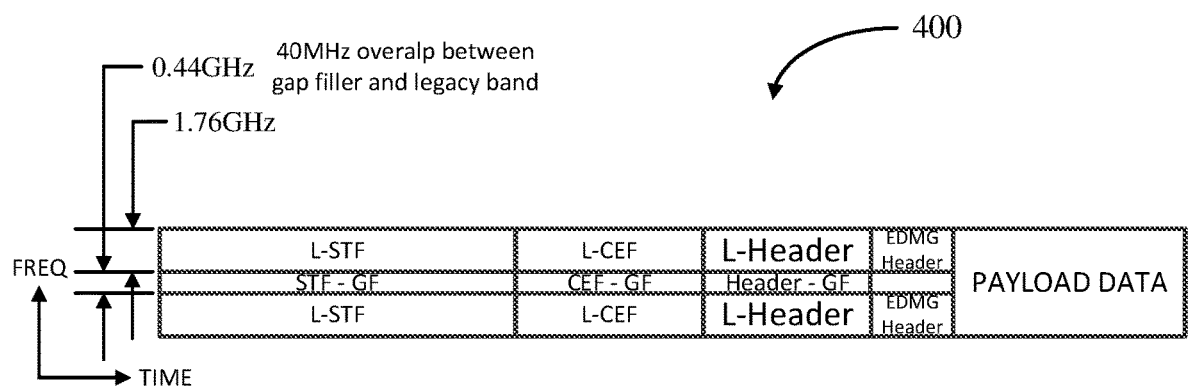
FIGS. 4A-4B illustrate exemplary frames for transmission via an orthogonal frequency division multiplexing (OFDM) signal in accordance with certain aspects of the present disclosure.
Figure 4B:
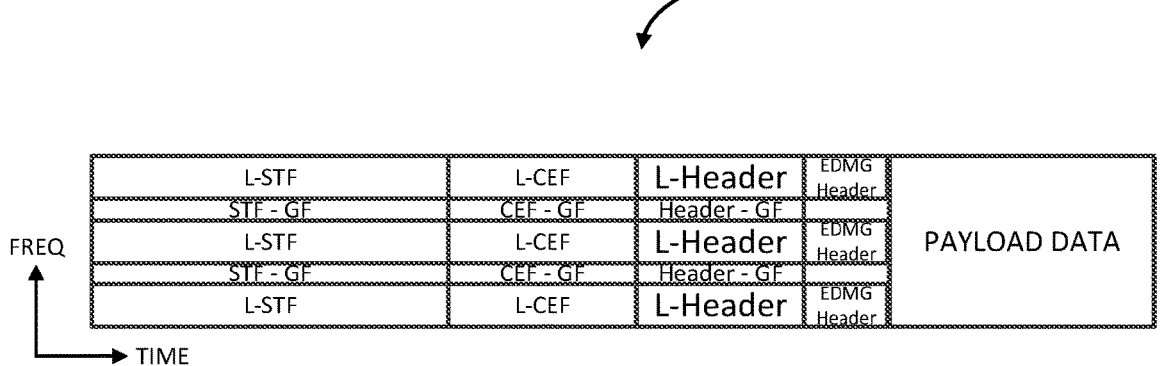

FIGS. 4A-4B illustrates exemplary frames 400 and 450 for transmission in accordance with an orthogonal frequency division multiplexing (OFDM) transmission mode per another aspect of the disclosure. The OFDM frame format should maintain the legacy 802.11ad preamble (L-STF and L-CEF) and L-Header as prefix in order to be backwards compliant. In addition, OFDM frames 400 and 450 are usually transmitted with some backoff to reduce peak to average power ratio (PARP), which needs to be applied to the legacy preambles themselves.

In this example, frame 400 is an example of a two bonded channel OFDM frame in accordance with the new protocol. The frame 400 comprises a first (e.g., 802.11ad) frequency channel (lower channel as shown) for transmitting the legacy preamble (L-STF and L-CEF), the legacy L-Header, and the EDMG Header with the optional appended payload data. The first channel may have a bandwidth of substantially 1.76 GHz. The frame 400 further comprises a second channel (upper channel as shown) for transmitting the legacy preamble (L-STF and L-CEF), legacy L-Header, and the EDMG Header. The transmission of the legacy preamble (L-STF and L-CEF) and legacy L-Header in the first and second channels is for 802.11ad backward compatibility. The payload data appended to the EDMG Header of the first channel may be different than the payload data appended to the EDMG Header of the second channel. The second channel may also have a bandwidth of substantially 1.76 GHz.

Additionally, the frame 400 comprises a gap filling (GF) channel situated in frequency between the first and second channels. The GF channel may have a bandwidth of substantially 0.44 GHz. Since the total bandwidth for the transmission is 3.92 GHz, the high frequency portion of the first channel overlaps with the low frequency portion of the GF channel by 20 MHz. Similarly, the high frequency portion of the GF channel overlaps with the low frequency portion of the second channel by 20 MHz. The preamble (STF-GF and CEF-GF) and Header-GF transmitted by way of the GF channel may be configured substantially the same as the legacy preamble (L-STF and L-CEF) and legacy L-Header, but the EDMG Header and appended optional data may not be redundantly transmitted. Legacy devices may not be able to decode the preamble (STF-GF and CEF-GF) and Header-GF transmitted by way of the GF channel, but new protocol devices may decode such fields. The transmission of the legacy preamble and legacy L-Header by way of the first, GF, and second channels are substantially time aligned. Likewise, the transmission of the EDMG Headers by way of the first and second channels is substantially time aligned.

The payload data of the frame 400 is transmitted by way of a bonded channel having a frequency band that includes a combination of the frequency bands of the first, GF, and second channels bonded together in frequency. As previously discussed, the transmission of the legacy preamble (L-STF and L-CEF), legacy L-Header, and EDMG Header are transmitted using an MCS specified in the legacy 802.11ad protocol. The data in the payload data field is transmitted using one of the MCS specified in accordance with the new protocol. Since the new protocol includes additional MCS beyond those specified in the legacy 802.11ad, the payload data may be transmitted using an MCS different than the MCS used to transmit the legacy preamble (L-STF and L-CEF), legacy L-Header, and EDMG Header. However, it shall be understood that the MCS used for transmitting the protocol payload data may be the same as the MCS used for transmitting the legacy preamble (L-STF and L-CEF), legacy L-Header, and EDMG Header, as the new protocol may include MCS common with those specified in the legacy protocol (e.g., 802.11ad).

The frame 450 is an example of a three channel bonded OFDM frame that is structurally the same as the two channel bonded OFDM frame, but includes an additional third channel and an additional GF channel situated in frequency between the second and third channels. The payload data is transmitted by way of a bonded channel having a frequency band that includes a combination of the frequency bands of the first, first GF, second, second GF, and third channels bonded together.

The EDMG Header for the OFDM frames 400 and 450 may be essentially the same as the EDMG Header 350 previously discussed, except that the Power difference field bits are indicated as reserved bits. This may be because OFDM frame may be transmitted with a substantially uniform average power throughout the duration of the frame.

Although frames 400 and 450 are examples of two-channel and three-channel bonding, it shall be understood that a frame may be configured in a similar manner to provide more than three bonded channels.

Frame Format for SC WB

FIGS. 5A-5D illustrates exemplary frames 500, 510, 520, and 530 for transmission using a single carrier wideband (SC WB) transmission mode in accordance with an aspect of the disclosure.

The SC WB transmission section includes three (3) sub-sections that may be present STF, CEF and payload data, and an optional beam training sequence (TRN). The STF is built on Golay codes (as in the legacy L-STF). During this period, a receiver is expected to complete: AGC, timing and frequency acquisition. The STF uses Golay sequences Ga and Gb in the same order as the 802.11ad STF. Optionally, the STF Golay sequence may have a length of 128 (as in 802.11ad) or 256 or 512.

The second CEF sequence uses similar Golay sequence construction as the legacy L-CEF of 802.11ad, only replacing the 128-length sequences with 256-length sequences for the two-bonded channel frame 510, with 512-length sequences for the three-bonded channel frame 520, and with 1024-length sequences for four (or more)-bonded channel frame 530. The formats of the Golay sequences of length 256, 512 and 1024 are as follows, using concatenated (||) $Ga_{128}$ and $Gb_{128}$ sequences from the 802.11ad standard:

$Ga_{256}=[Ga_{128}||Gb_{128}]$ and $Gb_{256}=[Ga_{128}||-Gb_{128}]$
$Ga_{512}=[Ga_{256}||Gb_{256}]$ and $Gb_{512}=[Ga_{256}||-Gb_{256}]$
$Ga_{1024}=[Ga_{512}||Gb_{512}]$ and $Gb_{1024}=[Ga_{512}||-Gb_{512}]$ The payload data is modulated using MSC similar to the 802.11ad with the following changes: (1) In addition to BPSK, QPSK and 16QAM, higher modulations are defined (and can be used): 64QAM, 64APSK, 128APSK, 256QAM, 256APSK; (2) FFT block can be 512 (as in 802.11ad) or 768, 1024, 1536 or 2048; and (3) guard interval (GI) (situated between adjacent FFT blocks) may also be based on Golay code as in 802.11ad, with more length options supported: 32, 64 (as in 802.11ad), 128 or 256.

As previously discussed, the beam training sequence (TRN) is optional in all cases. Note that if the SC WB transmission section (second STF, second CEF, payload data, and TRN) is not used, then a TRN field in accordance with 802.11ad may be provided. When the SB WB transmission section is used, then it uses the new protocol (e.g., 802.11ay) TRN options. The new protocol TRN field is built in the same way as the 802.11ad, with options to increase the Golay codes by factor of 2 or 4 (e.g., use Golay sequences of length 256 or 512, instead of 128).

With regard to exemplary frame 500, this case is the extension of the new protocol frame for a single channel. The frame 500 comprises the legacy preamble (L-STF and L-CEF), legacy L-Header, and EDMG Header. The frame 500 facilitates the new MCSs of the new protocol for the transmission of the STF and payload data. Note that second CEF is not present since for a single channel there is no need for re-estimating the channel. The STF is present since a receiver may improve the receiver chain setup for the higher constellations of the new protocol modulation.

With regard to exemplary frame 510, this case is the extension of the new protocol for a two-bonded channel frame. The frame 510 comprises a first frequency channel (lower channel) for transmitting the legacy preamble (L-STF and L-CEF), legacy L-Header, and EDMG Header. The frame 510 further comprises a second frequency channel (upper channel) for transmitting the legacy preamble (L-STF and L-CEF), legacy L-Header, and EDMG Header. Note, that the data appended to the EDMG Header of the first channel may be different than the data appended to the EDMG Header of the second channel. The information fields of the EDMG Header may be configured as per EDMG Header 350 previously discussed. The SC WB transmission section of the frame 510, namely the STF, CEF, payload data, and optional TRN, are transmitted via a bonded channel having a frequency band comprising at least a portion of each of the frequency bands of the first and second channels. As previously discussed, the transmission of the legacy preamble (L-STF and L-CEF), legacy L-Header, and EDMG Header uses an MCS specified in legacy 802.11ad, and the transmission of the SC WB transmission section uses an MCS specified in the new protocol, both of which may be different.

With regard to exemplary frame 520, this case is the extension of the new protocol frame for a three (3) bonded channel case. With regard to exemplary frame 530, this case is the extension of new protocol frame for the four (4) bonded channel case. Based on this discussion, it shall be understood that a frame may be configured to have any number of bonded channels.

When a station transmits on more than one channel, it may shift the symbol time between channels by any amount of time with the only constrain that the maximum difference between the earliest and latest will not exceed 1 symbol time in 1.76 GHz sampling rate. It means that the maximum difference may be limited to 0.568 nsec. The main reason for doing so is to reduce the aggregated PAPR. The time synchronization between the legacy MCS aggregate section and the SC WB transmission should be kept relative to the first (lowest-frequency) channel. Note that this skew may be used only for SC transmissions and not allowed in OFDM modes. Example: in two channels mode the shift can be ½ symbol, in three channels it can be ⅓ and ⅔ symbols, and in four channels ¼, ½ and ¾ symbols respectively.

Figure 5A:
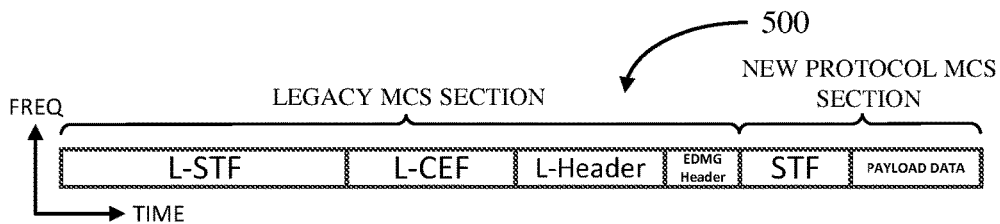
FIGS. 5A-5D illustrate exemplary frames for transmission via a single carrier wideband (SC WB) signal in accordance with certain aspects of the present disclosure.
Figure 5B:
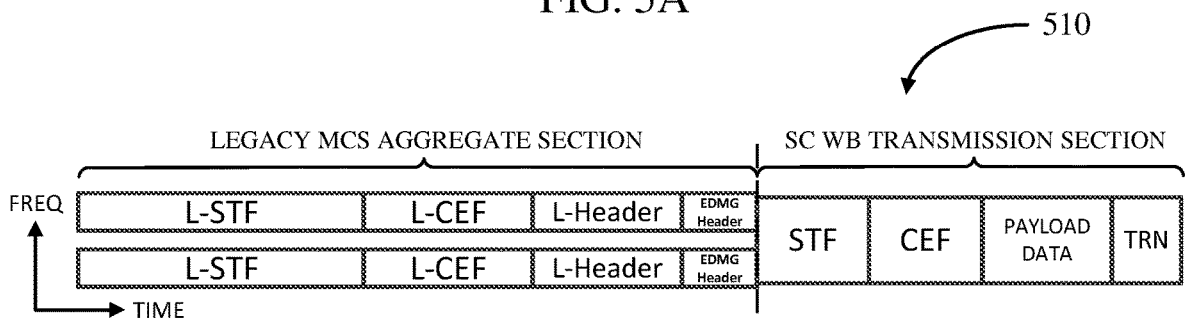
Figure 5C:
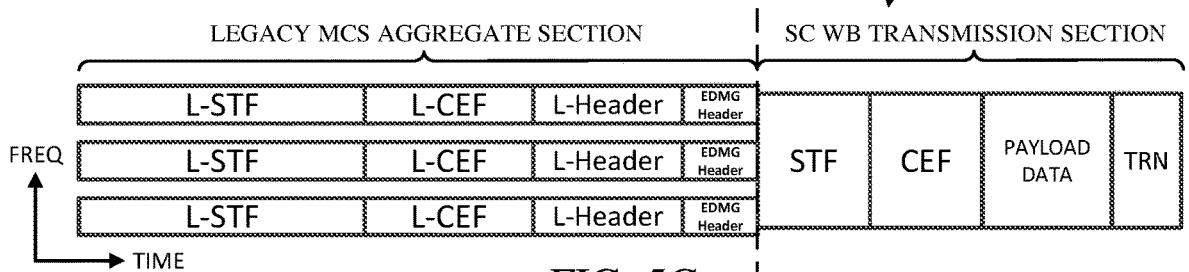
Figure 5D:
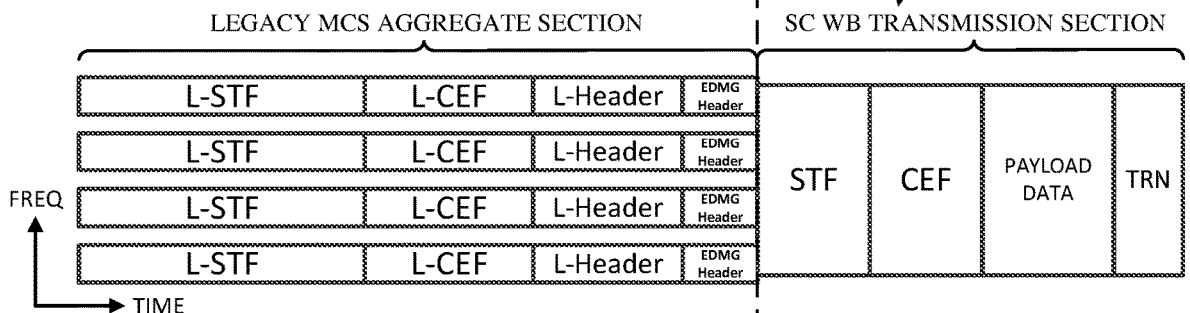
Figure 5E:
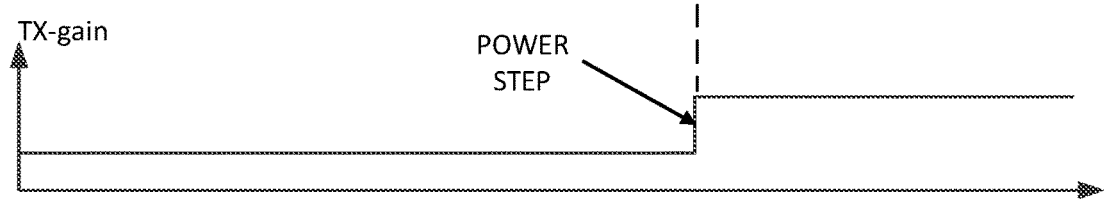
FIG. 5E illustrates an exemplary transmit power profile for an exemplary frame for transmission via a single carrier wideband (SC WB) signal in accordance with certain aspects of the present disclosure.
Figure 6A:
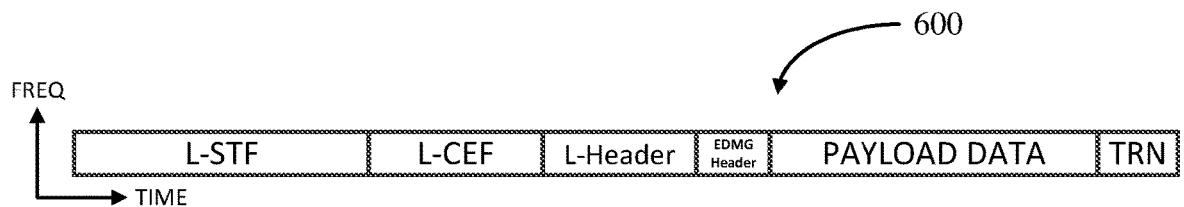
FIGS. 6A-6D illustrate exemplary frames for transmission via an aggregated single carrier (SC) signal in accordance with certain aspects of the present disclosure.
Figure 6B:
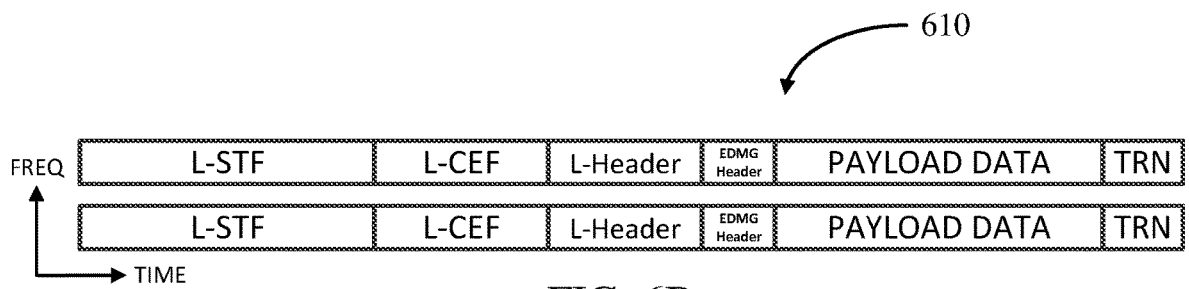
Figure 6C:
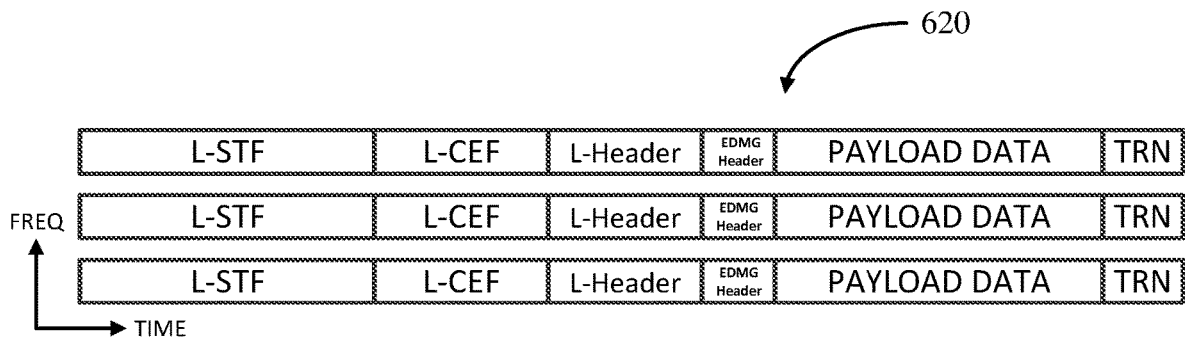
Figure 6D:
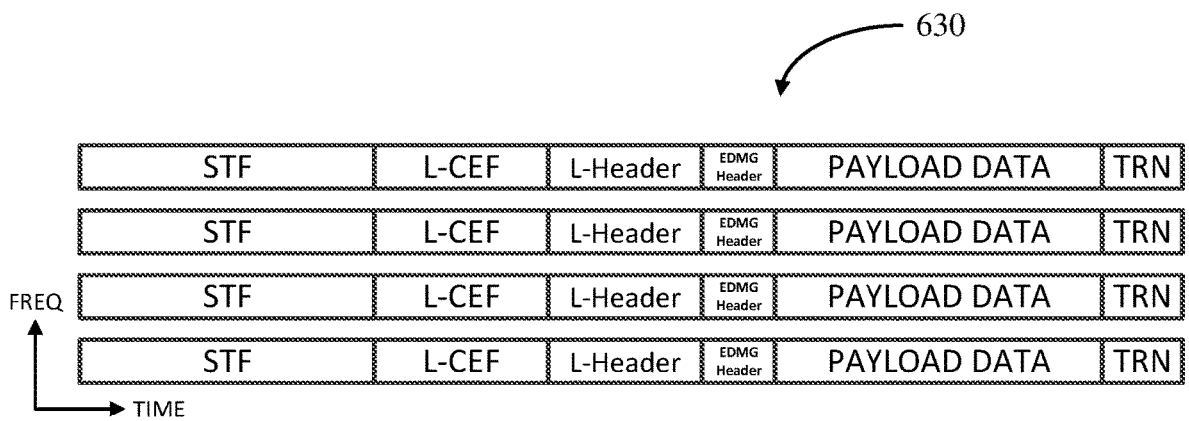

FIG. 5E illustrate an exemplary transmission power profile for any of the exemplary frames 510, 520, and 530 in accordance with another aspect of the disclosure. As illustrated, the transmit power level of the SC WB transmission section is greater than (or may be equal to) the transmit power level of the legacy MCS aggregate section. The use of SC WB transmission section and the legacy MCS aggregate section impose different transmitter back-offs due to PAPR differences and practical PAs. For any modulation scheme, one transmission has less PAPR than if the same modulation is used for two or more aggregated signals in order to keep the error vector magnitude (EVM) and/or transmission mask in compliance. It should be noted that different modulations have different PAPR, thus requiring different back-offs. The backoff value is implementation dependent (mainly on the PA).

In order to keep the new protocol transmission as efficient as possible in many cases, the legacy aggregate section transmitted in aggregation mode will require a higher back-off. This difference is an issue that may affect the receiver performance. To help receivers mitigate this, it is suggested that two mechanisms one for the legacy receivers and one for the targeted new protocol receiver may be employed. The transmitted power change is at the switch from aggregated section to the SC WB section, as shown in FIG. 5E.

The targeted new protocol receiver usually adjusts the receive chain at the beginning of the legacy L-STF. If there is a power change between the legacy aggregate section and the SC WB transmission section, the receiver may get into saturation. The receiver can adjust the AGC during the STF, but this may reduce the time of other activities like frequency and time acquisition (on the SC WB signal). To help the receiver, the Power difference field in the EDMG Header specifies the power step (e.g., difference between the transmit power levels of the SC WB transmission section and the legacy MCS aggregate section). The receiver may use it to anticipate the required AGC step, thus shortening the second AGC.

Legacy receivers (802.11ad) that receive the legacy preamble (L-STF and L-CEF) and L-Header, use these portions to update the NAV as one of the collision avoidance methods. However, these receivers also look at the received power, since in some cases the received power is low enough to allow reuse of the medium. In this case, the power step can mislead some of the receivers if the power is near the border. The update to the legacy header format, as previously mentioned, describes an option to signal the power step. A legacy receiver that can decode these bits (e.g., updated legacy receiver or user device) may act upon it to improve its power estimation. Note that this functionality is not critical for the collision avoidance system, and legacy receivers can operate without it.

Since the modes are using most of the reserved bits, and there is some need to have some additional bits (e.g., to signal power step in SC WB mode), the LSBs of the Data Length field may be used for this purpose. In all new protocol modes, the length bits in the legacy L-Header are only used for NAV computation. By using up to 4 bits for all MCSs (and even more if MSC-1 is excluded), the NAV computation is not affected. The 3 LSB bits of the legacy header length are used to signal the difference between the transmit power levels of the legacy aggregate section (L-STF, L-CEF, L-Header and EDMG Header) and the SC WB transmission section (STF, CEF and the payload data) in accordance with the following table:

| Bits | Power difference X [dB] |
|------|-------------------------|
| 001  | X <= 1                  |
| 010  | 1 < X <= 2.5            |
| 011  | 2.5 < X <= 4            |
| 100  | 4 < X <= 5.5            |
| 101  | 5.5 < X <= 7            |
| 110  | 7 < X <= 8.5            |
| 111  | 8.5 < X                 |

Frame Format for Aggregate SC

FIGS. 6A-6D illustrate exemplary frames 600, 610, 620, and 630 for transmission via an aggregate single carrier (SC) transmission mode in accordance with an aspect of the disclosure. Transmission in aggregate SC mode is an aggregation of legacy 802.11ad channels. Since the new protocol extends the modes of the 802.11ad, there is a need for EDMG Header bits.

The frame formats for both aggregate SC and SC WB (as discussed further herein) are similar in their first section (legacy L-STF, legacy L-CEF, legacy L-Header and EDMG Header), and different for the rest of the transmission. The similar part is kept the same since it is backward compatible with 802.11ad for the backward compatibility feature. It means that legacy (802.11ad) devices will be able to detect it and decode the legacy Header. As previously discussed, this feature allows legacy devices to update the NAV, that is part of the collision avoidance method. Furthermore, in channel bonded (CB) mode, the legacy L-STF, legacy L-CEF, and legacy L-Header are transmitted on all used channels to facilitate legacy devices on all channels to get the NAV.

The legacy (L-STF+L-CEF+L-Header) and the EDMG Header should be transmitted with the same power across aggregated channels. However, due to RF impairments, actual effective isotropic radiated power (EIRP) may differ. The EDMG Header is also transmitted in the 802.11ad channels. As previously discussed, the EDMG Header includes information that is part of the new protocol transmission only and also new protocol payload data is appended to the same symbol. The following considerations apply: (1) The legacy L-STF and L-CEF apply (no need for additional CEF); (2) MCS as defined in the legacy Header for 802.11ad apply to the payload data appended to the EDMG Header; (3) payload data appended to the EDMG Header improve overhead for short messages; (4) payload data appended to the EDMG Headers is split across channels in channel bonded (CB) modes to improve overhead; and (5) the average power should be kept the same (means that the power of L-STF, L-CEF, L-Header and EDMG Header are same) in each channel.

Frame 600 is an example of the extension of the new protocol for a single channel case. It facilitates the new MCSs of the new protocol for transmission of the payload data and optional TRN. Frame 610 is an example of the extension of the new protocol for a two aggregated channel case. It also facilitates the new MCSs of the new protocol for transmission of the payload data and optional TRN. Frame 620 is an example of the extension of new protocol for a three aggregated channel case. It facilitates the new MCSs of the new protocol for transmission of the payload data and optional TRN. And, frame 630 is an example of the extension of the new protocol for a four aggregated channel case. It facilitates the new MCSs of the new protocol for transmission of the payload data and optional TRN. The EDMG Header and appended payload data are the same as described for the SC WB transmission mode, except that there are no Power difference bits, they instead may be reserved bits.

There are two implementation options for the aggregate SC: (1) Each channel is independent; and (2) all channels are mixed. In this first option, each channel is independent. That is, the MCS for the payload data and optional TRN can be different in each channel. The LDPC blocks are confined to one channel, and each channel has its own blocks. Transmitter may assign different power per channel, but the power shall be fixed for the entire transmission. In this case, the EDMG Header can be different in each channel (e.g., different MCS per channel).

In this second option, all channels are bonded and mixed. That is, the MCS for the payload data and optional TRN is the same for all channels. The LDPC blocks are spread evenly between the channels. Transmitter may (and should) assign different power per channel to even the detection probability of each channel, but the power shall be fixed during the entire transmission. In this option, the EDMG Header may be the same in each channel.

Frame Format for MIMO

For MIMO, the legacy sections (L-STF, L-CEF, and L-Header), along with the EDMG Header, are sent in each transmit chain. Similar to 802.11ac, a delay ΔT is inserted between all transmissions of the legacy sections and EDMG Header to prevent unintentional beamforming. In other words, the transmissions of the legacy sections and EDMG Header of the separate transmissions are skewed with respect to each other by the delay ΔT.

For MIMO channel estimation, various techniques may be used in order to estimate the channel, without causing too much latency, and keeping substantially the same SNR. First is the use of delay between the sequences. If this delay is substantially 36.4 ns, then channel estimations can be separated at the receiver since the channel delay is no larger than 64 samples at 1.76 GHz. Second is the transmission of multiple orthogonal sequences using mapping orthogonal P-matrix ($P_{HTLTF}$) for high throughput long training field (HT-LTF) taken form 802.11mc, section 20.3.9.4.6. Third is the transmission of conjugate vs regular sequence. Forth one is the transmission of multiple orthogonal sequences using mapping P-matrix ($P_{VHTLTF}$) for very high throughput long training field (VHT-LTF) as defined in 22.3.8.3.5 in 802.11mc. Fifth, is to increase the length of the channel estimation for increased MIMO estimation accuracy. Increasing the length is done using the techniques above (forth technique), with the same Golay sequences. This option avoids the use of conjugated or delay sequence since it doubles the integration time of the channel estimation.

Frame Format for OFDM MIMO

Figure 7:
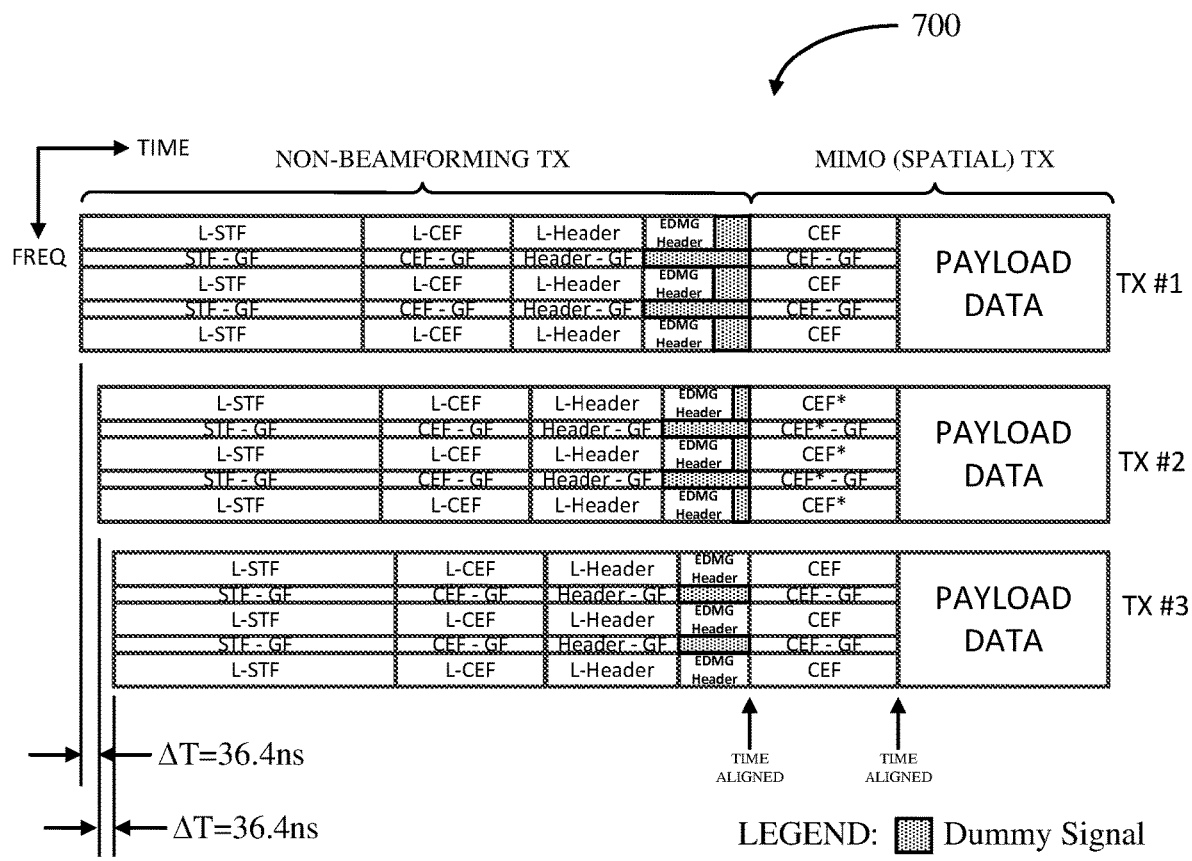
FIG. 7 illustrates an exemplary frame for transmission via a plurality (e.g., three (3)) of spatial multiple input multiple output (MIMO) orthogonal frequency division multiplexing (OFDM) signal in accordance with certain aspects of the present disclosure.

FIG. 7 illustrates an exemplary frame 700 for transmission of three (3) spatial transmission streams in a MIMO OFDM signal using channel bonding of three (3) in accordance with an aspect of the disclosure. Each of the spatial transmissions may be configured similar to that of frame 450 previously discussed. It shall be understood that each spatial transmission may include channel bonding of two or more than three.

The transmitted legacy section (L-STF, L-CES, and L-Header) and EDMG Header are transmitted with a delay $\Delta T$ (e.g., $\Delta T=36.4$ ns) between them to prevent unintentional beamforming. The section of the frame 700 after the EDMG Header may be transmitted in a time aligned MIMO manner That is, the channel estimation section (CEF, CEF-GF, CEF, CEF-GF, and CEF) and payload data of first transmission (TX #1) may be transmitted in a time aligned MIMO (spatial) manner with the channel estimation section (CEF*, CEF*-GF, CEF*, CEF*-GF, and CEF) and payload of second transmission (TX #1), as well as with the channel estimation section (CEF, CEF-GF, CEF, CEF-GF, and CEF) and payload of third transmission (TX #3).

Because of the delay $\Delta T$ between the respective legacy sections and EDMG headers, and the time alignment of the following sections (CES and payload data), there are gaps between these two parts of the frames in the first and second transmissions TX #1 and TX #2. These gaps are illustrated as shaded boxes for each of the legacy channels and gap filling channels. A transmitter transmitting the frame 700 may insert a dummy signal in each of these gaps to avoid transmission power change within the frame 700.

For the case of MIMO up to 2×2 (two spatial transmission each having a channel bonding of two), this delay is used to estimate the MIMO channel by applying the SISO (legacy) channel estimation sequence of the channel bonding in OFDM. For more than 2 streams, there is a need to include a new channel estimation sequence, which follows the EDMG Header signaling. This channel estimation sequences follow the same format as those for channel bonding, with the additional dimensions added to the estimation using the approaches above. Frame 700 is an example for channel boding of three (3), and MIMO of three (3) spatial transmission streams.

Frame Format for WB SC MIMO

Figure 8A:
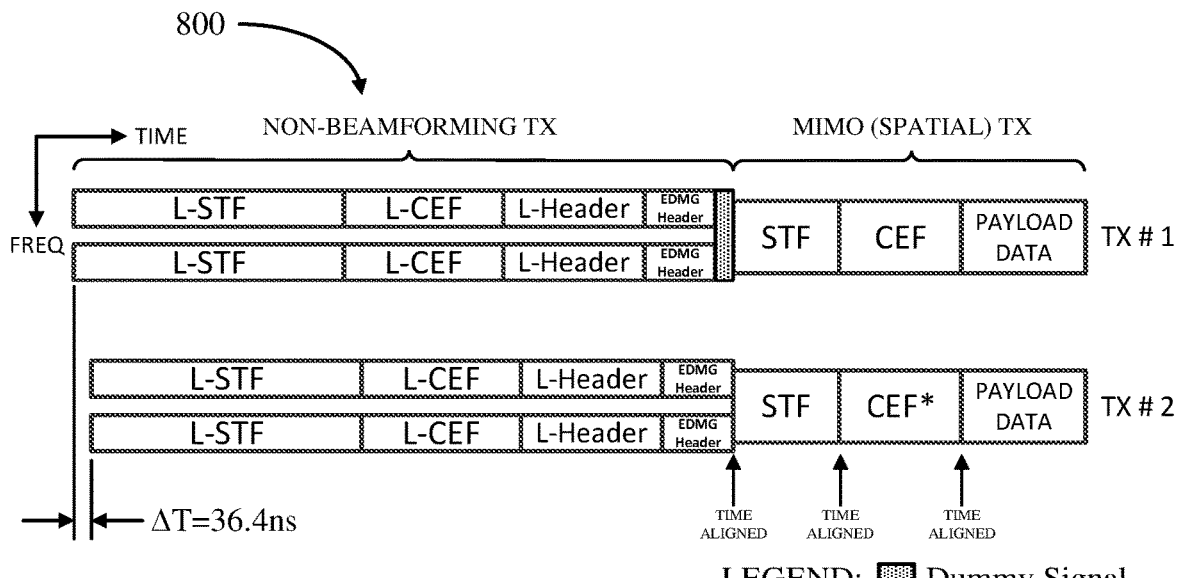
FIGS. 8A-8C illustrate exemplary frames for transmission via a plurality (e.g., two (2), four (4), and eight (8)) of spatial multiple input multiple output (MIMO) single carrier wideband (SC WB) signal in accordance with certain aspects of the present disclosure.
Figure 8B:
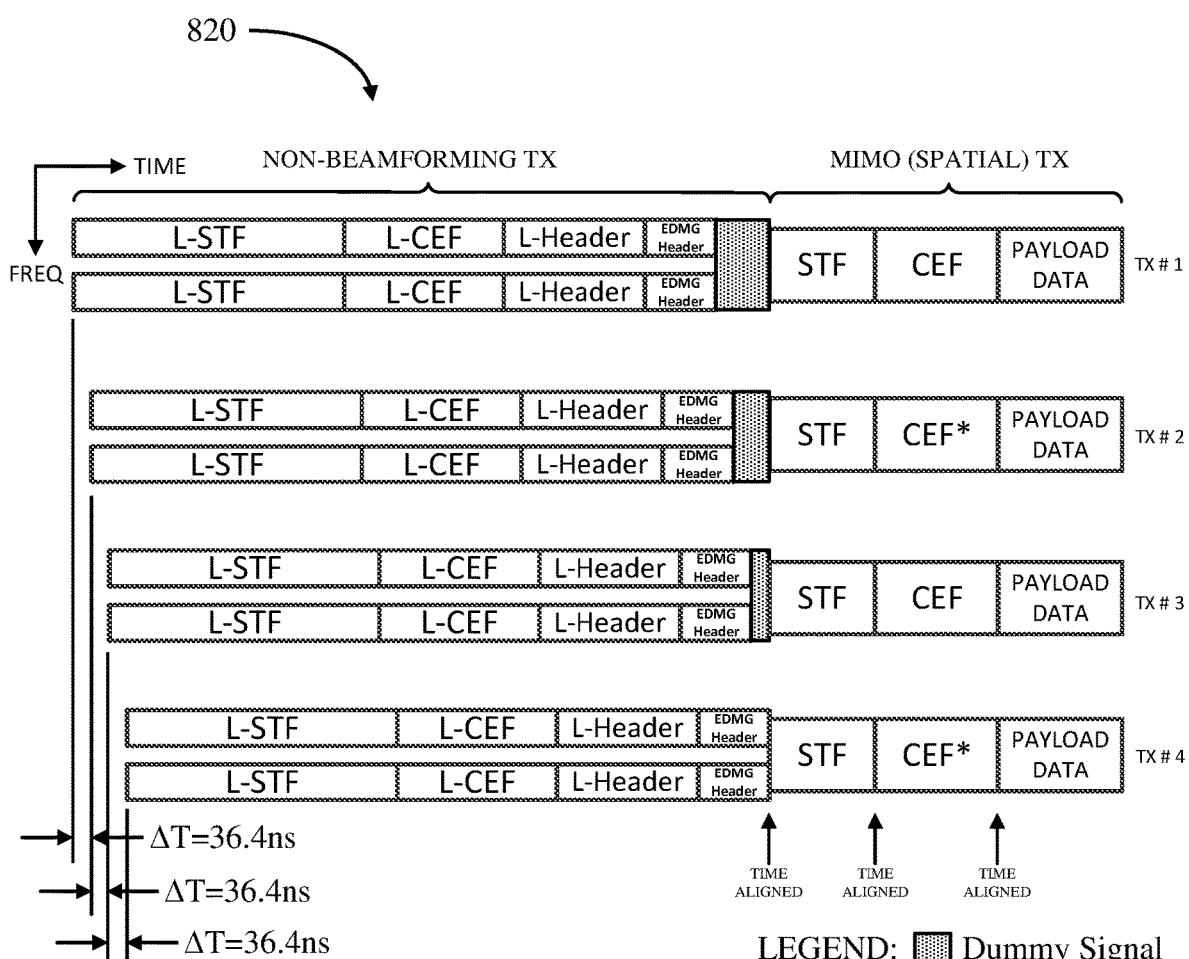
Figure 8C:
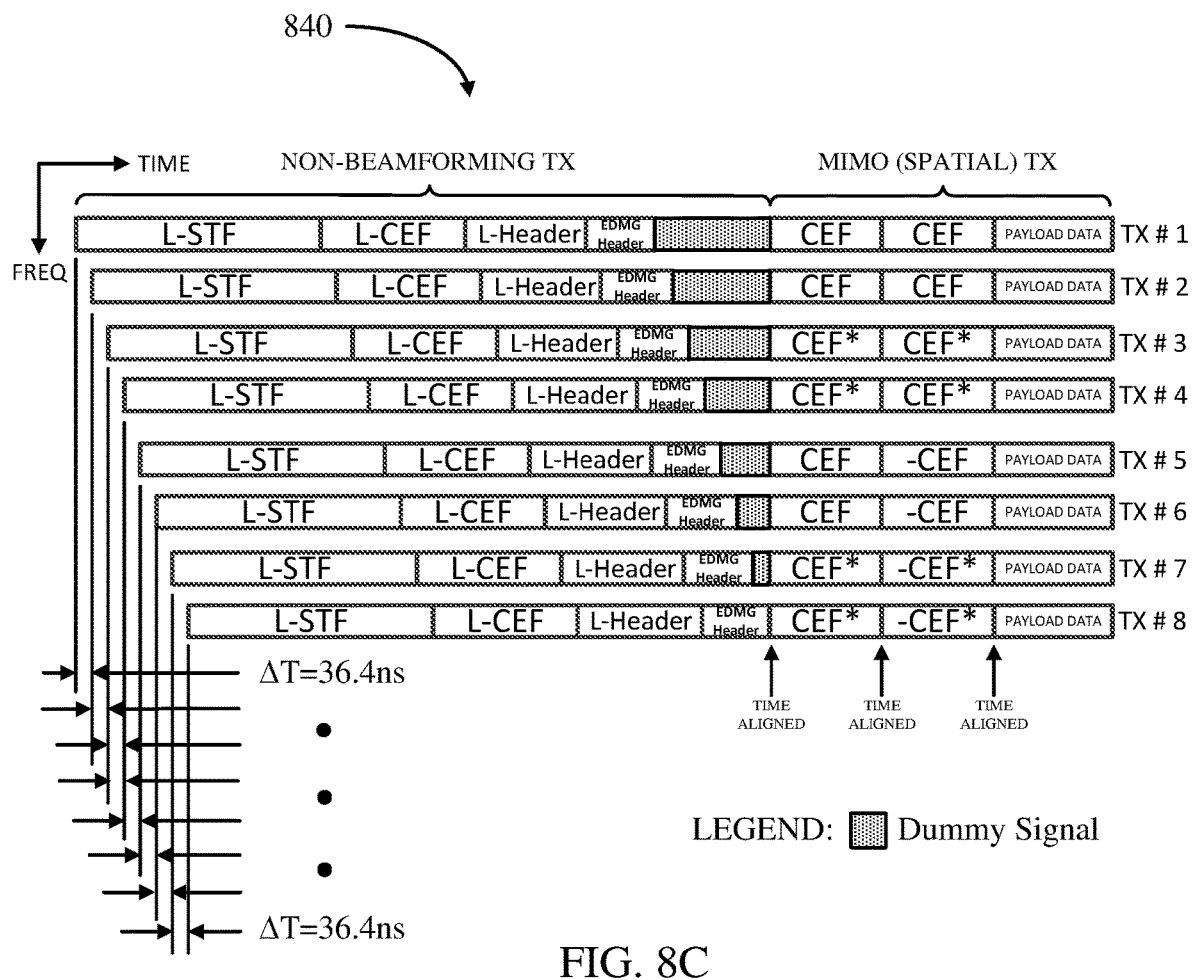

FIGS. 8A-8C illustrate exemplary frames 800, 820, and 840 for transmission of two (2), four (4), and eight (8) spatial streams in a MIMO SC WB signal in accordance with an aspect of the disclosure. Each of the spatial transmissions as illustrated in FIGS. 8A and 8B may be configured similar to frame 510 previously discussed. It shall be understood that each of the spatial transmission in FIGS. 8A and 8B may include a channel bonding of three or more, similar to frames 520 and 530 previously discussed.

Similar to frame 700, because of the beamforming preventing delay $\Delta T$ between the respective legacy sections (L-STF, L-CES, and L-Header) and EDMG Header sections of the transmissions TX #1 and TX #2 in frame 800 and spatial transmissions TX #1, TX #2, TX #3, and TX #4 in frame 820, there are gaps between two parts of the frames in the first transmissions TX #1 of frame 800, and in the first, second, and third transmissions TX #1, TX #2, and TX #3 of frame 820. These gaps are illustrated as shaded boxes for each of the legacy channels and gap filling channels. A transmitter transmitting the frame 800 or 820 may insert a dummy signal in each of these gaps to avoid transmission power change within the frame 800 or 820, respectively.

Also, similar to frame 700, the second STF, second CEF, and payload data of the first and second transmissions TX #1 and TX #2 of frame 800 are transmitted in a time aligned MIMO (spatial) manner. In a like manner, the second STF, second CEF, and payload data of the first, second, third, and fourth transmissions TX #1 to TX #4 of frame 820 are transmitted in a time aligned MIMO (spatial) manner.

Each of the spatial transmissions of frame 840 illustrated in FIG. 8C may be configured similar to frame 500, with the exception that a second (new protocol) CEF and longer sequences thereof (e.g., two concatenated CEF, two concatenated conjugate CEF (CEF*), CEF concatenated with a –CEF, and a CEF* concatenated with a –CEF*). The use of different combinations of CEF, CEF*, –CEF, and –CEF* allow for receivers to differentiate the channel estimations for the different spatial transmissions. Because of the beamforming preventing delay $\Delta T$, transmissions TX #1 to TX #7 of frame 840 include dummy signals transmitted in the gaps (shaded area) between the legacy/EDMG section and the following CEF section to avoid transmission power change in the frame 840. Similarly, the respective CES and payload data sections of the transmissions TX #1 to TX #7 of frame 840 are transmitted in a time aligned MIMO (spatial) manner.

For SC WB, the transmission is divided into two stages, before the beginning of the second STF and after it. Before the transmission of the second STF, the MIMO transmission includes the legacy L-STF, the legacy L-CEF, the legacy L-Header and the EDMG Header, such that each transmit chain is sending this same signal just delayed by 64 samples at 1.76 GHz (e.g., 36.4 ns) This is done in order to assure no unintentional beamforming is happening. During the L-STF, all transmitting antennas send the same data. Then in the channel estimation field (CEF) time, each antenna is sending different sequence, so to allow the receiver to estimate the entire spatial channel.

Frame 800 is an example for a two (2) spatial streams and two (2) channel bonding transmission. Frame 820 is an example for a four (4) spatial streams and 2 channel bonding transmission. Frame 840 is an example for an eight (8) spatial streams and single channel transmission.

Frame Format for Aggregate SC MIMO

Figure 9A:
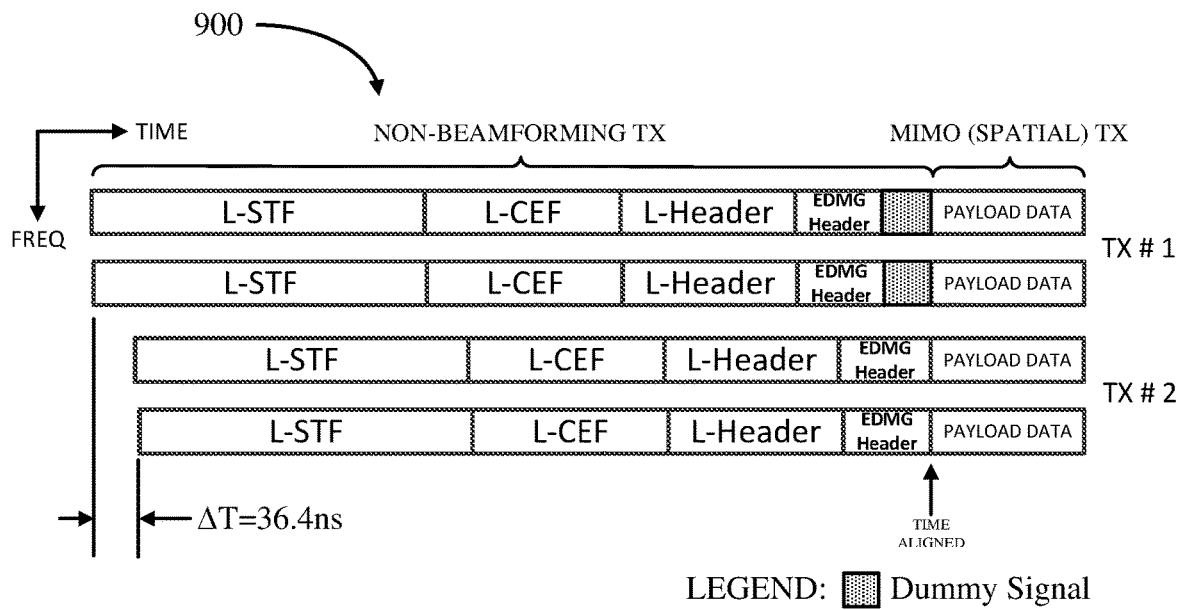
FIGS. 9A-9B illustrate exemplary frames for transmission via a plurality (e.g., two (2) and three (3)) of spatial multiple input multiple output (MIMO) aggregated single carrier (SC) signal in accordance with certain aspects of the present disclosure.
Figure 9B:
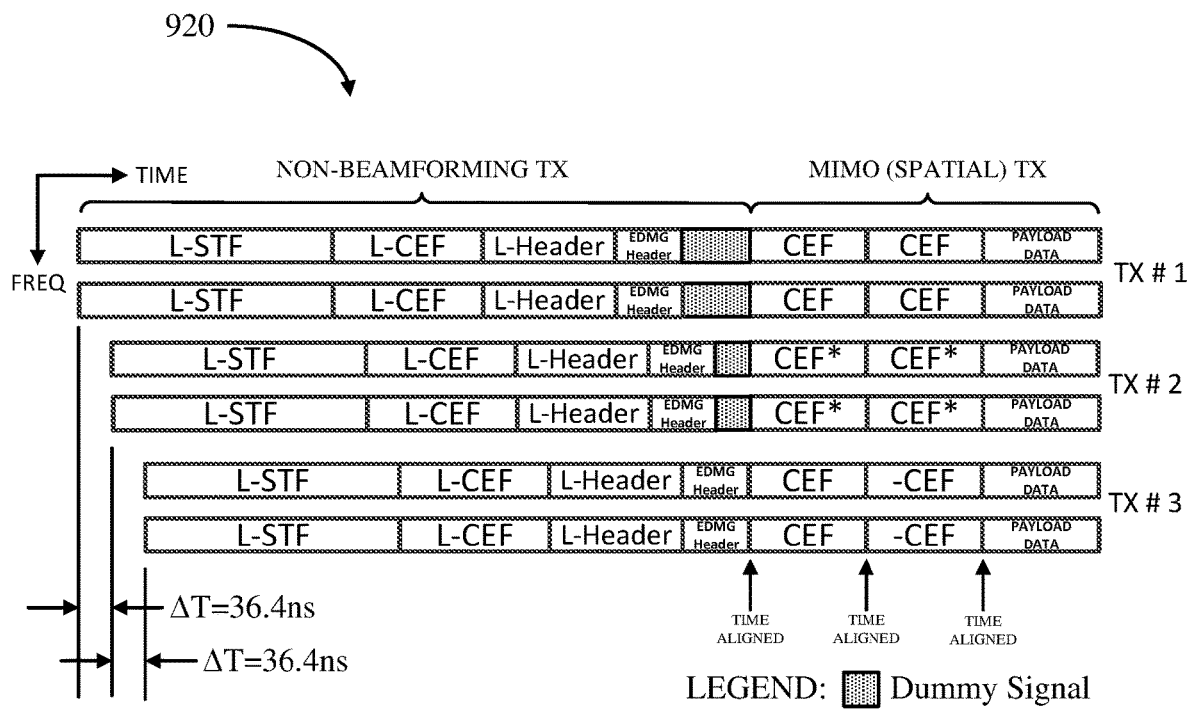

FIGS. 9A-9B illustrate exemplary frames 900 and 920 for transmission of two (2) and three (3) spatial streams in a MIMO aggregate transmission mode in accordance with an aspect of the disclosure. Each of the spatial transmissions may be configured similar to a two-channel aggregate SC frame, such as frame 610 previously discussed. It shall be understood that each of the spatial transmission may include aggregate channels of less than or more than two.

Similarly, each of the spatial transmissions illustrated in FIG. 9B may be configured similar to a two-channel aggregate SC frame, such as frame 610, with the exception that a second (new protocol) CEF and longer sequences thereof (e.g., two concatenated CEF, two concatenated conjugate CEF (CEF*), CEF concatenated with a –CEF, and a CEF* concatenated with a –CEF*). The use of different combinations of CEF, CEF*, –CEF, and –CEF* allow for receivers to differentiate the channel estimations for the different spatial transmissions.

MIMO aggregate SC uses the same technique as the SC WB transmission mode, i.e., the three methods, with the difference of the channel estimation in the gap between the band not being transmitted (which is not MIMO related anyway), so the basic sequences are 802.11ad CEF sequences transmitted multiple times.

Exemplary frame 900 is an example for the 2 channel bonding with two (2) MIMO spatial transmissions. Then there is no need for adding additional CEF sequence, because the MIMO channel estimation is done using the CEF of the legacy preamble. Exemplary frame 920 is an example for the case of MIMO three (3) spatial transmissions, and then additional CEF sequences are needed in order to estimate the spatial channels. The CEF sequences are like the one used for the SC WB above. Similar to the previous MIMO frames, because of the beamforming preventing delay ΔT, the transmission TX #1 in frame 900 and transmissions TX #1 and TX #2 in frame 920 include dummy signals transmitted in the gaps (shaded area) between the legacy/EDMG section and the following CEF and/or payload data section to avoid transmission power change in the frame 900 or 920, respectively.

Similarly, the respective payload data sections of the transmissions TX #1 to TX #2 of frame 900 are transmitted in a time aligned MIMO (spatial) manner. In a like manner, the respective CEF and payload data sections of the transmissions TX #1 to TX #3 of frame 920 are transmitted in a time aligned MIMO (spatial) manner.

Figure 10:
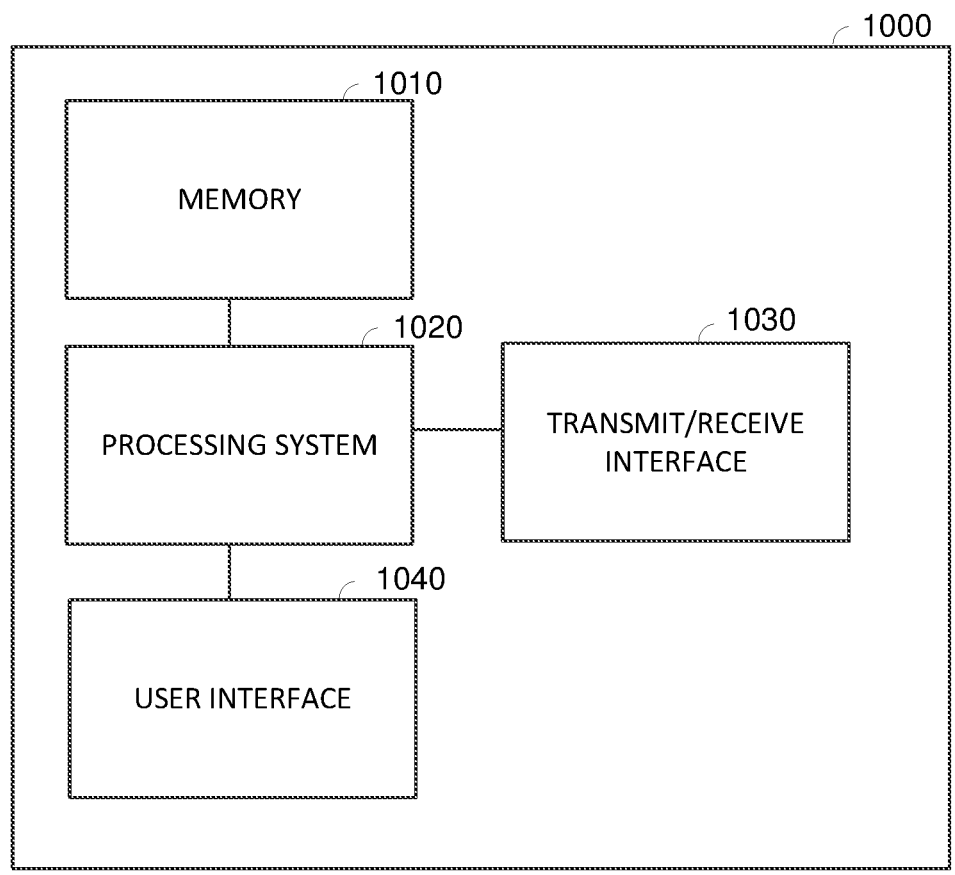
FIG. 10 illustrates a block diagram of an exemplary wireless device in accordance with certain aspects of the present disclosure.

FIG. 10 illustrates an example device 1000 according to certain aspects of the present disclosure. The device 1000 may be configured to operate in an access point or a user device to perform the one or more of the operations described herein. The device 1000 includes a processing system 1020, and a memory 1010 coupled to the processing system 1020. The memory 1010 may store instructions that, when executed by the processing system 1020, cause the processing system 1020 to perform one or more of the operations described herein. Exemplary implementations of the processing system 1020 are provided below. The device 1000 also comprises a transmit/receiver interface 1030 coupled to the processing system 1020. The interface 1030 (e.g., interface bus) may be configured to interface the processing system 1020 to a radio frequency (RF) front end (e.g., transceivers 226-1 to 226-N, 266-1 to 226-M), as discussed further below.

In certain aspects, the processing system 1020 may include one or more of the following: a transmit data processor (e.g., transmit data processor 220 or 260), a frame builder (e.g., frame builder 222 or 262), a transmit processor (e.g., transmit processor 224 or 264) and/or a controller (e.g., controller 234 or 274) for performing one or more of the operations described herein. In these aspects, the processing system 1020 may generate a frame and output the frame to an RF front end (e.g., transceiver 226-1 to 226-N or 266-1 to 266-M) via the interface 1030 for wireless transmission (e.g., to an access point or a user device).

In certain aspects, the processing system 1020 may include one or more of the following: a receive processor (e.g., receive processor 242 or 282), a receive data processor (e.g., receive data processor 244 or 284) and/or a controller (e.g., controller 234 and 274) for performing one or more of the operations described herein. In these aspects, the processing system 1020 may receive a frame from an RF front end (e.g., transceivers 226-1 to 226-N or 266-1 to 266-M) via the interface 1030 and process the frame according to any one or more of the aspects discussed above.

In the case of a user device, the device 1000 may include a user interface 1040 coupled to the processing system 1020. The user interface 1040 may be configured to receive data from a user (e.g., via keypad, mouse, joystick, etc.) and provide the data to the processing system 1020. The user interface 1040 may also be configured to output data from the processing system 1020 to the user (e.g., via a display, speaker, etc.). In this case, the data may undergo additional processing before being output to the user. In the case of an access point 212, the user interface 1040 may be omitted.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

For instance, some examples of means for generating a frame include the processing system 1020, Tx frame processing system 202, frame builder 222, and frame builder 262. Some examples of means for outputting the frame for transmission include the transmit/receive interface 1030, interface 208, transmit processor 224, and transmit processor 264.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It shall be understood that the processing as described herein may be performed by any digital means as discussed above, and or any analog means or circuitry.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth.

A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of any of the user devices 106, 108, and 110 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    an interface configured to receive a frame comprising a preamble, a first header, and a second header, wherein the preamble and the first header are configured to be decoded by a first device operating according to a first protocol, the second header not being configured to be decoded by the first device, and wherein the preamble, the first header, and the second header are configured to be decoded by a second device operating according to a second protocol, wherein the first protocol includes a first set of available modulation coding schemes (MCS) and the second protocol includes a second set of available modulation coding schemes (MCS), the first set of MCS being different than the second set of MCS, wherein a first set of header data for the first header and a second set of header data for the second header is modulated and coded using at least one of the MCS in the first set, wherein the frame further comprises a first payload data appended directly to the second header, wherein the first payload data of the frame is modulated and coded using the at least one of the MCS in the first set, wherein the frame further comprises a second payload data, and wherein the second payload data of the frame is modulated and coded using one of the MCS in the second set of MCS; and
    a processing system configured to process at least a portion of the frame to recover the first and second payload data.

2. The apparatus of claim 1, wherein the first payload data appended to the second header includes a particular quantity of data to allow the processing system to set up for processing the second payload data while processing the first payload data appended to the second header.

3. The apparatus of claim 1, wherein the second header comprises information indicating a length of the first payload data and the second payload data for one or more channels associated with the reception of the frame.

4. The apparatus of claim 1, wherein the frame includes an orthogonal frequency division multiplexing (OFDM) signal or a single carrier (SC) signal.

5. The apparatus of claim 4, wherein the first header comprises a first set of header data indicating whether the frame includes the OFDM signal or the SC signal.

6. The apparatus of claim 1, wherein the preamble comprises a first short training field (STF) and a first channel estimation field (CEF), wherein the frame further comprises a second short training field (STF) and a payload data.

7. The apparatus of claim 6, wherein the second STF and the payload data of the frame are modulated on a single carrier.

8. The apparatus of claim 1, further comprising:
    at least one antenna; and
    a receiver configured to receive the frame via the at least one antenna, wherein the apparatus is configured as a wireless node.

9. An apparatus for wireless communications, comprising:
    an interface configured to receive a frame comprising a preamble, a first header, and a second header, wherein the preamble and the first header are configured to be decoded by a first device operating according to a first protocol, the second header not being configured to be decoded by the first device, and wherein the preamble, the first header, and the second header are configured to be decoded by a second device operating according to a second protocol, wherein the preamble comprises a first short training field (STF) and a first channel estimation field (CEF), wherein the frame further comprises a second short training field (STF) and a payload data, wherein the second STF and the payload data of the frame are modulated on a single carrier, and wherein the interface is configured to receive the first STF, the first CEF, the first header, and the second header of the frame in a time skewed manner via a plurality of channels, respectively; and
    a processing system configured to process at least a portion of the frame to recover the payload data.

10. The apparatus of claim 9, wherein the frame comprises a second channel estimation field (CEF), and wherein the second CEF of the frame is modulated on the single carrier.

11. The apparatus of claim 9, further comprising:
    at least one antenna; and
    a receiver configured to receive the frame via the at least one antenna, wherein the apparatus is configured as a wireless node.

12. An apparatus for wireless communications, comprising:
    an interface configured to receive a frame comprising a preamble, a first header, and a second header, wherein the preamble and the first header are configured to be decoded by a first device operating according to a first protocol, the second header not being configured to be decoded by the first device, and wherein the preamble, the first header, and the second header are configured to be decoded by a second device operating according to a second protocol, wherein the preamble comprises a first short training field (STF) and a first channel estimation field (CEF), wherein the frame further comprises a second short training field (STF) and a payload data, wherein the frame comprises a second channel estimation field (CEF), wherein the second CEF of the frame is modulated on a single carrier, and wherein the interface is configured to receive the second STF, the second CEF, and the payload data of the frame via a bonded channel comprising at least a portion of a plurality of channels, and wherein the second header comprises information specifying a number of the plurality of channels included in the bonded channel or information identifying a lowest frequency of the plurality of channels included in the bonded channel; and a processing system configured to process at least a portion of the frame to recover the payload data.

13. The apparatus of claim 12, wherein a first power level of the second STF, the second CEF, and the payload data is equal to or higher than a second power level of the first STF, the first CEF, the first header, and the second header.

14. The apparatus of claim 13, wherein the second header comprises information indicating a power difference between the first power level and the second power level.

15. The apparatus of claim 13, wherein the first header comprises information indicating a power difference between the first power level and the second power level, wherein the power difference information is not specified in the first protocol.

16. The apparatus of claim 12, further comprising:
at least one antenna; and
a receiver configured to receive the frame via the at least one antenna, wherein the apparatus is configured as a wireless node.

17. An apparatus for wireless communications, comprising:
an interface configured to receive a frame comprising a preamble, a first header, and a second header, wherein the preamble and the first header are configured to be decoded by a first device operating according to a first protocol, the second header not being configured to be decoded by the first device, and wherein the preamble, the first header, and the second header are configured to be decoded by a second device operating according to a second protocol, wherein the frame further comprises a first payload data, wherein the first header and the second header include header data modulated and coded using a modulation coding scheme (MCS) specified in the first protocol, wherein the first payload data of the frame is modulated and coded using a first modulation coding scheme (MCS) specified in the second protocol, wherein the frame further comprises a third header having a same configuration as the second header, the third header including information different than that of the second header, wherein the interface is configured to redundantly receive preamble and the first header in a time aligned or time skewed manner via first and second channels, and receive the second header and the third header in a time aligned or time skewed manner via the first and second channels, respectively; and
a processing system configured to process at least a portion of the frame to recover the first payload data.

18. The apparatus of claim 17, wherein the frame further comprises a second payload data, the second payload data of the frame is modulated and coded with a second modulation coding scheme (MCS) specified in the second protocol, the second MCS being different than the first MCS, wherein the interface is configured to redundantly receive the preamble and the first header in a time aligned or time skewed manner via first and second channels, and receive the first payload data and the second payload data in a time aligned or time skewed manner via the first and second channels, respectively.

19. The apparatus of claim 18, wherein the first payload data comprises a first set of one or more coded data blocks, the second payload data comprises a second set of one or more coded data blocks, the first set of one or more coded data blocks being different than the second set of one or more coded data blocks.

20. The apparatus of claim 17, wherein the frame further comprises a second payload data, the second payload data of the frame is modulated and coded using the first MCS specified in the second protocol, wherein the interface is configured to redundantly receive the preamble, the first header, the second header in a time aligned or time skewed manner via first and second channels, and receive the first payload data and the second payload data in a time aligned or time skewed manner via the first and second channels, respectively.

21. The apparatus of claim 20, wherein the first and second payload data comprise a plurality of coded data blocks, and wherein the interface is configured to receive first and second portions of the coded data blocks via the first and second channels, respectively.

22. The apparatus of claim 17, further comprising:
at least one antenna; and
a receiver configured to receive the frame via the at least one antenna, wherein the apparatus is configured as a wireless node.

23. An apparatus for wireless communications, comprising:
an interface configured to receive a frame comprising a preamble, a first header, and a second header, wherein the preamble and the first header are configured to be decoded by a first device operating according to a first protocol, the second header not being configured to be decoded by the first device, and wherein the preamble, the first header, and the second header are configured to be decoded by a second device operating according to a second protocol, wherein the preamble comprises a first set of short training fields (STFs) and a first set of channel estimation fields (CEFs), the frame further comprises a second set of channel estimation fields (CEFs) and a payload data, wherein the interface is configured to receive the first set of STFs, the first set of CEFs, the first header, the second header, and the second set of CEFs via a first set of channels, respectively, and receive the payload data via a first bonded channel including the first set of channels, and wherein the first bonded channel is associated with a first spatial reception; and
a processing system configured to process at least a portion of the frame to recover the payload data.

24. The apparatus of claim 23, wherein the interface is configured to receive the first set of STFs, the first set of CEFs, the first header, the second header, and the second set of CEFs via a second set of channels, respectively, receive the payload data via a second bonded channel including the second set of channels, wherein the reception of the first set of STFs, the first set of CEFs and the first header of the second set of channels is skewed with respect to the reception of the first set of STFs, the first set of CEFs, and the first header of the second set of channels, wherein the second bonded channel is associated with a second spatial reception.

25. The apparatus of claim 23, wherein the interface is configured to receive the first set of STFs, the first set of CEFs, the first header, the second header, and a conjugate of the second set of CEFs via a second set of channels, respectively, and receive the payload data via a second bonded channel including the second set of channels, wherein the second bonded channel is associated with a second spatial reception.

26. The apparatus of claim 25, wherein the interface is configured to receive the second set of CEFs and the conjugate of the second set of CEFs in a substantially time aligned manner.

27. The apparatus of claim 23, wherein the interface is configured to receive first set of STFs, the first set of CEFs, the first header, the second header, and a third set of CEFs a via a second set of channels, respectively, and receive the payload data via a second bonded channel including the second set of channels, wherein the second bonded channel is associated with a second spatial reception, and wherein the second set of CEFs and the third set of CEFs use different orthogonal sequences, respectively.

28. The apparatus of claim 23, further comprising:
at least one antenna; and
a receiver configured to receive the frame via the at least one antenna, wherein the apparatus is configured as a wireless node.

29. An apparatus for wireless communications, comprising:
an interface configured to receive a frame comprising a preamble, a first header, and a second header, wherein the preamble and the first header are configured to be decoded by a first device operating according to a first protocol, the second header not being configured to be decoded by the first device, and wherein the preamble, the first header, and the second header are configured to be decoded by a second device operating according to a second protocol, wherein the frame further comprises a payload data, wherein the interface is configured to receive the preamble, the first header, and the second header via a first set of channels, wherein the first set of channels are associated with a first reception, wherein the interface is further configured to receive the preamble, the first header, and the second header via a second set of channels, wherein the second set of channels are associated with a second reception, and the second reception is skewed with respect to the first reception by a time interval; and
a processing system configured to process at least a portion of the frame to recover the payload data.

30. The apparatus of claim 29, wherein the interface is configured to receive the payload data associated with the first set of channels and the payload data associated with the second set of channels in a substantially time aligned manner.

31. The apparatus of claim 29, wherein the preamble comprises a first channel estimation field (CEF), wherein the frame comprises a second channel estimation field (CEF), wherein the interface is configured to receive the second CEF via the first set of channels, and receive a conjugate of the second CEF via the second set of channels.

32. The apparatus of claim 29, further comprising:
at least one antenna; and
a receiver configured to receive the frame via the at least one antenna, wherein the apparatus is configured as a wireless node.

* * * * *